United States Patent
Ludurczak et al.

(10) Patent No.: US 12,270,710 B2
(45) Date of Patent: Apr. 8, 2025

(54) INFRARED IMAGING MICROBOLOMETER AND ASSOCIATED PRODUCTION METHODS

(71) Applicant: LYNRED, Palaiseau (FR)

(72) Inventors: Willy Ludurczak, Lyons (FR); Marc Guillaumont, Grenoble (FR)

(73) Assignee: LYNRED, Palaiseau (FR)

( * ) Notice: Subject to any disclaimer, the term of this patent is extended or adjusted under 35 U.S.C. 154(b) by 0 days.

(21) Appl. No.: 18/010,901

(22) PCT Filed: Jul. 27, 2021

(86) PCT No.: PCT/FR2021/051401
§ 371 (c)(1),
(2) Date: Dec. 16, 2022

(87) PCT Pub. No.: WO2022/023664
PCT Pub. Date: Feb. 3, 2022

(65) Prior Publication Data
US 2023/0236065 A1    Jul. 27, 2023

(30) Foreign Application Priority Data

Jul. 29, 2020  (FR) ................................ 2008005
Apr. 14, 2021  (FR) ................................ 2103820

(51) Int. Cl.
*G01J 5/08*   (2022.01)
*G01J 5/02*   (2022.01)
*G01J 5/20*   (2006.01)

(52) U.S. Cl.
CPC .............. *G01J 5/0853* (2013.01); *G01J 5/024* (2013.01); *G01J 5/20* (2013.01)

(58) Field of Classification Search
CPC .............. G01J 5/0853; G01J 5/024; G01J 5/20
See application file for complete search history.

(56) References Cited

U.S. PATENT DOCUMENTS

| | | | |
|---|---|---|---|
| 6,198,098 B1 * | 3/2001 | Laou | G01J 5/20 250/338.4 |
| 6,251,786 B1 | 6/2001 | Zhuo et al. | |

(Continued)

FOREIGN PATENT DOCUMENTS

| | | |
|---|---|---|
| CA | 3113900 A1 | 6/2020 |
| CN | 108298495 A | 7/2018 |

(Continued)

OTHER PUBLICATIONS

International Search Report issued in PCT Patent Application No. PCT/FR2021/051401, dated Nov. 19, 2021.

*Primary Examiner* — Kiho Kim
(74) *Attorney, Agent, or Firm* — MARSHALL, GERSTEIN & BORUN LLP

(57) ABSTRACT

An infrared imaging microbolometer integrating a membrane assembled in suspension above a substrate by means of holding arms attached to anchoring nails is disclosed. The membrane includes a support layer crossing the upper end of the anchoring nails. It also includes an absorber or electrode deposited on the support layer and on the anchoring nails with a pattern forming at least two electrodes. It further includes a dielectric layer deposited on the absorber or electrode and on the support layer, at least two conductive vias formed through the dielectric layer in contact with the at least two electrodes, and a thermometric or thermoresistive material arranged on a planar surface formed at the level of the upper ends of the conductive vias.

23 Claims, 22 Drawing Sheets

(56) References Cited

U.S. PATENT DOCUMENTS

| | | | |
|---|---|---|---|
| 2005/0116169 A1* | 6/2005 | Tohyama | G01J 5/20 |
| | | | 250/338.1 |
| 2015/0053858 A1* | 2/2015 | Imperinetti | H05K 3/0094 |
| | | | 29/852 |
| 2019/0027522 A1 | 1/2019 | Kropelnicki et al. | |

FOREIGN PATENT DOCUMENTS

| | | |
|---|---|---|
| EP | 2840370 A1 | 2/2015 |
| EP | 3401657 A1 | 11/2018 |
| FR | 3077878 A1 | 8/2019 |
| FR | 3077879 A1 | 8/2019 |

* cited by examiner

State of the art

State of the art

State of the art

State of the art

State of the art

State of the art

INFRARED IMAGING MICROBOLOMETER AND ASSOCIATED PRODUCTION METHODS

DOMAIN OF THE INVENTION

The present disclosure relates to the field of the detection of electromagnetic radiations and, more precisely, to the detection of infrared radiations.

The invention concerns, on the one hand, an infrared imaging microbolometer having an improved performance and, on the other hand, a plurality of associated manufacturing methods.

BACKGROUND

In the field of detectors implemented for infrared imaging, it is known to use devices arranged in an array, likely to operate at room temperature, that is, requiring no cooling to very low temperatures, conversely to detection devices called "quantum detectors" which require an operation at very low temperature.

These detectors conventionally use the variation of a physical quantity of an appropriate material or assembly of materials, according to temperature, around 300 K. In the specific case of microbolometric detectors, which are the most currently used, this physical quantity is the electric resistivity, but other quantities may be used, such as the dielectric constant, the biasing, the thermal expansion, the refraction index, etc.

Such an uncooled detector generally associates:
means for absorbing the thermal radiation and for converting said thermal radiation into heat;
means for thermally insulating the detector, to enable it to heat up under the action of the thermal radiation;
thermometry means which, in the context of a microbolometric detector, use a resistive element having its resistance varying with temperature;
and means for reading the electric signals supplied by the thermometry means.

Detectors used for thermal or infrared imaging are conventionally manufactured in the form of an array of elementary detectors, forming image points or pixels, in one or two dimensions. To guarantee the thermal insulation of the detectors, the latter are suspended above a substrate by support arms.

The substrate usually comprises means of sequential addressing of the elementary detectors and means of electric excitation and of pre-processing of the electric signals generated from these elementary detectors. The substrate and the integrated means are commonly designated with the term "read-out circuit".

To obtain a scene via this type of this detector, said scene is captured through an adapted optical system on the array of elementary detectors, and rated electric stimuli are applied via the readout circuit to each of the elementary detectors, or to each row of such detectors, to obtain an electric signal forming the image of the temperature reached by each of said elementary detectors. This signal is more or less elaborately processed by the readout circuit, and then possibly by an electronic device external to the package, to generate the thermal image of the observed scene.

More precisely, an elementary detector is formed of a membrane held in fixed suspension above the substrate by anchoring nails. The membrane integrates a thermometric or thermoresistive material, which performs a transduction of the infrared radiations, forming the thermometry means.

The measurement of the electric resistance of the thermometric or thermoresistive material is performed by the readout circuit. For this purpose, the thermometric or thermoresistive material is electrically connected to the readout circuit through the anchoring nails and by electrodes extending into the holding arms. In certain cases, the electrodes also perform a function of absorber of the infrared radiations by means of a material, for example, metallic, extending under the thermometric or thermoresistive material and into the holding arms. In addition to the reading of the signal across the thermometric material, the absorbing material or electrode also has the function of absorbing the infrared flux to transmit it to the thermometric or thermoresistive material. The quantity of absorbed infrared radiation is dependent on the surface area of this absorber or electrode.

To optimize the absorption of the infrared radiation, the absorbing material or electrode covers a maximum surface area in the area occupied by the pixel. In practice, its surface area is limited by that of the membrane. The thickness of the absorbing material or electrode is adjusted so that its effective impedance per square is adapted to that of vacuum: $Z_0$=377 ohm/square.

FIGS. 1a to 1f illustrate a method of forming a microbolometer 100 of the state of the art, such as for example described in document EP 3 182 081.

A first step, illustrated in FIG. 1a, comprises depositing and structuring a sacrificial layer 12 and a support layer 13 on a substrate 11 integrating the readout circuit. The structuring of these two layers 12, 13 enables to obtain openings where anchor nails 14 can be formed. As illustrated in FIG. 1b, the forming of anchoring nails 14 in the openings aims at obtaining a conductive pad extending at least all the way to the level of the upper end of support layer 13.

Absorber or electrode 16 is then deposited on support layer 13 and on the upper portion of anchoring nail 14. The next step, illustrated in FIG. 1c, comprises structuring absorber or electrode 16 to form the electrodes and the absorption portions of microbolometer 100. A thermometric or thermoresistive material 18 is then deposited on support layer 13 and on absorber or electrode 16. As illustrated in FIG. 1d, the lateral portions of this thermometric or thermoresistive material 18 are etched all the way to absorber or electrode 16 so that the thermometric or thermoresistive material 18 extends over the central portion of microbolometer 100 and ensures an electric contact between the different portions of the absorber or electrode 16.

As illustrated in FIG. 1e, a protection layer 19 is then deposited on absorber or electrode 16 and on thermometric or thermoresistive material 18. Layers 13, 16, and 19 are then etched according to the desired pattern to form the membrane and the membrane holding arms. Finally, step 1f illustrates the removal of sacrificial layer 12, thus releasing the membrane suspended on anchoring nails 14.

The performance of the microbolometer 100 thus obtained depends on a plurality of factors and in particular on the nature of the thermometric or thermoresistive material 18.

To obtain a small low-frequency noise coefficient, it is known to use a vanadium oxide thermometric or thermoresistive material 18.

However, such a vanadium oxide thermometric or thermoresistive material 18 generates low-frequency noise on the current measured across microbolometer 100 when the substrate which receives the deposition of the thermometric or thermoresistive material 18 has surface unevennesses Rp.

In the state of the art described in reference to FIGS. 1a to 1f, such surface unevennesses Rp necessarily appear on the substrate which receives the deposition of the thermometric or thermoresistive material 18 and on absorber or electrode 16, this deposition enabling to ensure the electric contact between these two elements.

It is thus desired to be able to deposit the thermometric or thermoresistive material 18 on a planar surface while ensuring the electric continuity with absorber or electrode 16.

For this purpose, a solution described in document CN 108298495 comprises depositing the thermometric or thermoresistive material on the support layer and forming the absorber or electrode above the thermometric or thermoresistive material.

However, the absorber or electrode must be structured over a plurality of height levels to ensure an electric contact between anchoring nails extending at the level of the support layer and the top of the thermometric or thermoresistive material. As a result, the tuning of the absorber or electrode with a reflector deposited on the substrate is necessarily less efficient, since this tuning requires a fixed distance between these two elements.

The technical problem of the invention thus is to obtain a microbolometer with an absorber or electrode and a thermometric or thermoresistive material deposited on planar surfaces while ensuring a reliable electric contact between the absorber or electrode and the thermometric or thermoresistive material.

SUMMARY OF THE DISCLOSURE

The invention originates from an observation according to which it is not necessary to deposit the thermometric or thermoresistive material directly in contact with the absorbing material or electrode to obtain an efficient thermoelectric transduction. Indeed, the thermometric or thermoresistive material has the function of transforming the temperature variations of the scene captured by the absorber or electrode into electric resistance variations across the electrodes formed by this same absorber or electrode.

The invention has shown that by connecting the thermometric or thermoresistive material to the absorber or electrode by means of conductive vias, it is possible to carry out the thermal and electric exchanges without degrading the performance of the microbolometer.

Thus, the invention provides addressing the technical problem by depositing a dielectric layer on an absorber or electrode and by forming conductive vias through this dielectric layer all the way to the absorber or electrode to form a planar surface with emerging contacts enabling to deposit the thermometric or thermoresistive material without creating local defects. Typically, the selected dielectric layer is made of silicon with an electric conductivity much lower than that of the absorber or electrode. For example, a factor of at least 1,000 may be considered between the electric conductivity of the dielectric layer and the electric conductivity of the absorber or electrode. Thus, the dielectric layer may have an electric conductivity greater than 1Ω·cm For this purpose, according to a first aspect, the invention concerns an infrared imaging microbolometer integrating a membrane assembled in suspension above a substrate by means of holding arms attached on anchoring nails, said membrane comprising:

a support layer crossed by the anchoring nails;
an absorber or electrode, deposited on said support layer and on the anchoring nails with a pattern forming at least two electrodes;
a dielectric layer deposited on said absorber or electrode and on said support layer;
at least two conductive vias formed through the dielectric layer in contact with said at least two electrodes; and
a thermometric or thermoresistive material arranged on a planar surface formed at the level of the upper ends of said conductive vias.

The invention enables to obtain a microbolometer with a thermometric or thermoresistive material and an absorber or electrode deposited on planar surfaces, while ensuring an electric continuity between the electrodes of the absorbing material or electrode and the thermometric or thermoresistive material by means of conductive vias.

The microbolometer thus obtained can thus integrate a vanadium oxide thermometric or thermoresistive material, which keeps a small low-frequency noise coefficient since the thermometric or thermoresistive material is deposited on a planar surface.

As a variant, the thermometric or thermoresistive material may be made of a semiconductor metal oxide, such a vanadium oxide, titanium oxide, or nickel oxide, associated or not with a stabilizing or metal element such as described in documents FR3077878 and FR3077879. Further, the deposition of the absorber or electrode on a planar surface enables to adjust the distance of the absorber or electrode with a reflector deposited on the substrate to increase the quantity of detected infrared radiations.

The invention thus enables to obtain a high-performance microbolometer, for which the noise is generally limited on the current measured across the microbolometer.

With the observation according to which it is possible to perform the thermal and electric exchanges of a microbolometer without degrading its performance by connecting the thermometric or thermoresistive material to the absorber or electrode by means of conductive vias, a plurality of different embodiments may be implemented, particularly to form these conductive vias.

According to a first embodiment, the conductive vias are formed by deposition of a material based on tungsten into openings of the dielectric layer deposited on the absorber or electrode.

According to this first embodiment, the method of forming an infrared imaging microbolometer comprises the steps of:

deposition of a sacrificial layer and of a support layer on a substrate;
forming of anchoring nails through the sacrificial layer and the support layer;
deposition and structuring of an absorber or electrode on the support layer and on the anchoring nails;
deposition of a dielectric layer on the absorber or electrode and on the support layer;
structuring of the dielectric layer to form openings extending all the way to the absorber or electrode;
deposition of a conductive material based on tungsten to fill the openings thus formed within the dielectric layer and to ensure an electric contact between the conductive material and the absorber or electrode;
removal of the conductive material from said openings to form a planar surface;
deposition of a thermometric or thermoresistive material on the planar surface thus formed so that the thermometric or thermoresistive material is thermally and electrically connected to said absorber or electrode via the conductive material deposited in the openings of said dielectric layer;
structuring of the holding arms; and removal of the sacrificial layer.

Preferably, the deposition of the conductive material is performed by a conformal vapor deposition. For example, the conductive material may be deposited by chemical vapor deposition or CVD or by physical vapor deposition PVD.

In the sense of the invention, a "conformal" deposition corresponds to a deposition where the deposited particles of material uniformly cover the support surface having the deposition performed thereon, whatever the vertical or horizontal orientation of this surface.

Thus, this conformal deposition of the conductive material enables to efficiently fill the openings of the dielectric layer and to obtain a satisfactory thermal and electric continuity between the electrodes of the absorber or electrode and the thermometric or thermoresistive material.

Preferably, said dielectric layer is structured by means of a reactive ion etching with a stop on said absorber or electrode. Reactive ion etching is better known under acronym RIE. This reactive ion etching may be implemented with a conductive stop layer, such as the absorber or electrode. This technology enables to obtain an accurate structuring of the openings. Thus, this RIE enables to accurately adjust the shape and the size of the openings according to the thermal and electric continuity needs between the electrodes of the absorber or electrode and the thermometric or thermoresistive material. For example, the openings may have a width smaller than 1 micrometer, typically smaller than 400 nanometers.

In the sense of the invention, the "width" of the openings corresponds to the largest dimension of the transverse cross-section of said openings. Thus, if the openings are cylindrical, the width of the openings corresponds to the diameter thereof. Preferably, the openings have a square cross-section and the width corresponds to the diagonal of this square.

By associating RIE and conformal deposition, conductive vias with a controlled shape and filling emerge onto the planar surface, intended to receive the deposition of the thermometric or thermoresistive material.

This planar surface is formed after the removal of the conductive layer deposited outside of the openings.

For this purpose, it is possible to use a reactive ion etching with a stop on said dielectric layer.

As a variant, the removal of the conductive layer deposited outside of the openings is performed by chemical-mechanical polishing of said conductive material. In this embodiment, the planar surface may be formed by a stop layer, deposited on the dielectric layer, enabling to stop the chemical-mechanical polishing of the conductive material. In this variant, said method also comprises the following steps:

deposition of a stop layer on the dielectric layer before it is structured;
  structuring of said dielectric layer by means of a first reactive ion etching of said stop layer and of a second reactive ion etching of said dielectric layer;
  deposition of the conductive material based on tungsten into said openings of said stop layer; and
  removal of said conductive material from said openings by means of a chemical-mechanical polishing of said conductive material at least all the way to the level of said stop layer.

This stop layer may then be kept to form the planar surface. In this embodiment, when the chemical-mechanical polishing of the conductive material is performed all the way to the level of the stop layer, the deposition of said thermometric or thermoresistive material is performed on said conductive material and on said stop layer. This embodiment enables to guarantee the flatness of the surface of deposition of the thermometric or thermoresistive material by using a stop layer highly resistant to the chemical-mechanical polishing process, for example, a silicon oxide or nitride layer.

As a variant, the stop layer may be suppressed after the chemical-mechanical polishing step.

In this embodiment, when the chemical-mechanical polishing of the conductive material is performed all the way to the level of the dielectric layer, the method comprises a step of removal of said stop layer; the deposition of said thermometric or thermoresistive material is performed on said conductive material and on said dielectric layer.

This embodiment enables to limit the thickness between the absorber or electrode and the thermometric or thermoresistive layer to ease the heat transfer. Indeed, although the most part of the heat transfer is performed by the conductive vias, part of the heat transfer may also be performed through the dielectric layer. The removal of the stop layer enables to improve this heat transfer through the dielectric layer.

Further, it is possible to decrease the thickness of the areas intended to form the holding arms of the microbolometer to limit heat exchanges between the substrate and the thermometric or thermoresistive material. For this purpose, the method of the invention preferably comprises a step of thinning of said dielectric layer in an area intended to form the holding arms of the microbolometer.

To accurately control the thickness etched during the dielectric layer thinning step, the method may comprise a step of deposition of a thinning stop layer at the level of the holding arms of the microbolometer, the thinning being performed all the way to said thinning stop layer. The latter may be removed after said thinning step.

Further, a protection layer may also be deposited on the dielectric layer and the thermometric or thermoresistive material to protect the thermometric or thermoresistive material during the step of removal of the sacrificial layer.

The thinning may be performed after the deposition of this protection layer to also obtain a partial removal of this protection layer in the areas intended to form the holding arms of the microbolometer.

According to a second embodiment, the method of forming an infrared imaging microbolometer comprises the following steps:

deposition of a sacrificial layer and of a support layer on a substrate;
  forming of anchoring nails through the sacrificial layer and the support layer;
  deposition of an absorber or electrode on the support layer and on the anchoring nails and structuring of the absorber or electrode;
  deposition of a dielectric layer based on silicon;
  local deposition of a metal siliciding material on said dielectric layer;
  thermal treatment of the metal siliciding material to form an intermetallic between the metallic material and the dielectric layer and to form conductive vias in said dielectric layer; this anneal step enables to form a specific crystal phase to decrease the electric resistivity of the via;
  deposition of a thermometric or thermoresistive material on the dielectric layer so that the thermometric or thermoresistive material is thermally and electrically connected to said absorber or electrode via the conductive vias formed in said dielectric layer;
  structuring of the holding arms; and
  removal of the sacrificial layer.

Conversely to the first embodiment, in this second embodiment, the conductive vias are obtained by local transformation of the dielectric layer by means of a siliciding process.

For this purpose, the dielectric layer is based on silicon and the metal siliciding material is likely to form a stable crystal phase, the metal being for example selected to be made of nickel or of cobalt. Further, the metal siliciding material may be associated with other compounds, such as platinum.

In the sense of the invention, the siliciding corresponds to an incorporation method enabling to form a silicide and to form a low-resistivity alloy made of metal and of silicon. By incorporating a metallic material, such as nickel, with silicon, it is thus possible to obtain a nickel silicide intermetallic.

The silicide obtained by incorporation of a metallic material enables to form conductive vias within the dielectric layer, the latter being natively non- or little conductive.

To obtain the local deposition of the metallic material—precursor of the siliciding, it is possible to use a photolithography step, a step of deposition of the metal siliciding material, followed by a resin removal step. This etch-less method is called "lift-off" in literature.

However, this local deposition method may result in a poorly accurate placement of the metallic material. To overcome this difficulty, a sacrificial layer may be used to delimit openings within which the metal siliciding material is deposited.

According to this variant, the step of local deposition of the metal siliciding material on the dielectric layer comprises the following sub-steps:
 deposition of a sacrificial layer on the dielectric layer;
 structuring of the sacrificial layer to form openings extending all the way to the dielectric layer;
 deposition of the metal siliciding material to fill the openings thus formed within the dielectric layer; and
 removal of the sacrificial layer.

Further, during the thermal anneal implemented to obtain the incorporation of the metal siliciding material into the dielectric layer, an increase of the volume thereof may occur. To overcome this difficulty, it is possible to partially etch this dielectric layer before the incorporation.

According to this variant, the step of local deposition of the metal siliciding material on the dielectric layer also comprises a sub-step of partial etching of said dielectric layer at the level of the openings before the step of deposition of the metal siliciding material.

Concerning the thermal anneal implemented to obtain the incorporation, a single thermal anneal step can be envisaged. For example, the step of thermal anneal of the metal siliciding material may be carried out with a temperature in the range from 350° C. to 450° C. for a minimum time period of 30 s.

According to a third embodiment, the conductive vias are obtained by local ion implantation into the dielectric layer.

According to this embodiment, the method of forming an infrared imaging microbolometer comprises the following steps:
 deposition of a sacrificial layer and of a support layer on a substrate;
 forming of anchoring nails through the sacrificial layer and the support layer;
 deposition of an absorber or electrode on the support layer and on the anchoring nails and structuring of the absorber or electrode;
 deposition of a dielectric layer on the absorber or electrode and on the support layer;
 deposition of a masking layer on said dielectric layer;
 structuring of said masking layer to form openings extending all the way to the dielectric layer;
 ion implantation of a metal element through the openings thus formed to incorporate the metal element into said dielectric layer and form conductive vias in said dielectric layer;
 removal of the masking layer;
 deposition of a thermometric or thermoresistive material on the dielectric layer so that the thermometric or thermoresistive material is thermally and electrically connected to said absorber or electrode via the conductive vias formed in said dielectric layer;
 structuring of the holding arms; and
 removal of the sacrificial layer.

As for the second embodiment, in the third embodiment, the conductive vias are obtained by local transformation of the dielectric layer. However, in the third embodiment, the transformation is performed by means of an ion implantation of a metal element.

In the sense of the invention, an ion implantation corresponds to a modification of the physical properties of a material by ion implantation. By using the ions of a metal element, the ion implantation enables to implant conductive ions into the dielectric layer to form conductive vias inside of the dielectric layer, natively non- or little conductive.

Further, the method may also comprise a step of thermal anneal of the metal element. This thermal anneal may be used to homogenize the ion implantation profile inside of the dielectric layer, to form metal conduction paths, and to obtain a specific crystal phase of a stable intermetallic between the silicon and the metal element.

As a variant, it is also possible to perform a plurality of successive implantations having different ion acceleration voltages. Preferably, these successive implantations are performed with a fixed or very slightly variable ion beam current. The variation of the ion acceleration voltages may be obtained, for example, by variation of a bias voltage. These successive implantations enable to do away with the thermal anneal step and to obtain a homogenization of the metal element concentration.

As for the second embodiment, the local transformation of the dielectric layer formed according to the third embodiment enables to guarantee a planar surface to deposit the thermometric or thermoresistive material without the forming of defects likely to generate low-frequency noise.

BRIEF DESCRIPTION OF THE DRAWINGS

The invention will be well understood on reading of the following description, the details of which are given as an example only, and developed in relation with the appended drawings, where identical references relate to identical elements.

DETAILED DESCRIPTION

Figure 1A:
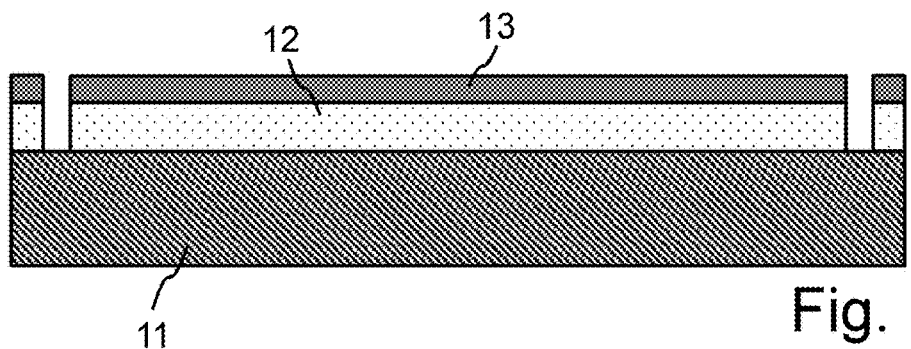
FIGS. 1a-1f illustrate the steps of the forming of a microbolometer of the state of the art.
Figure 1B:
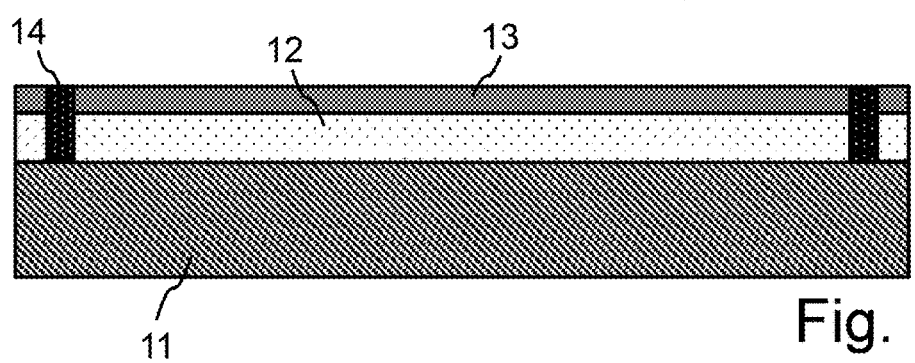
Figure 1C:
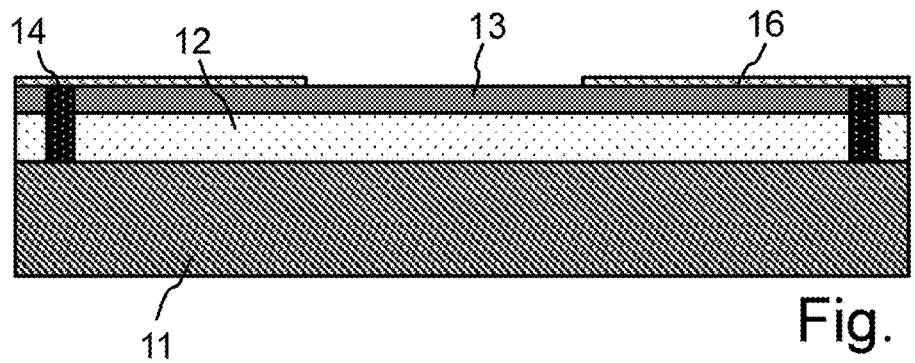
Figure 1D:
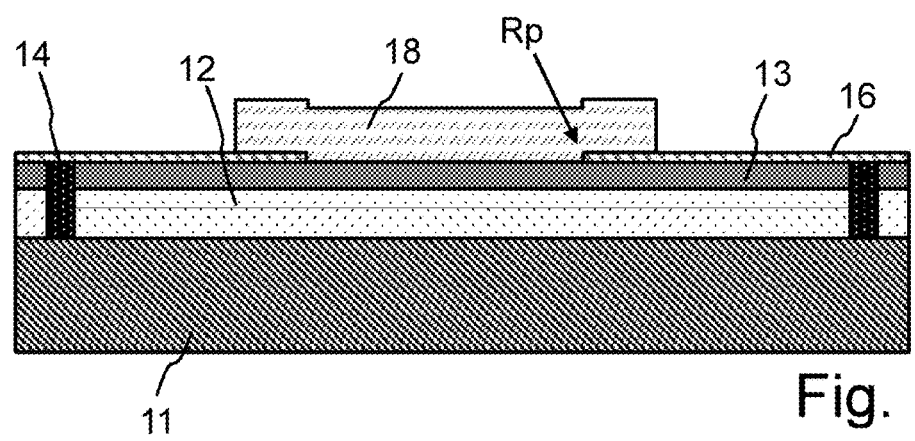
Figure 1E:
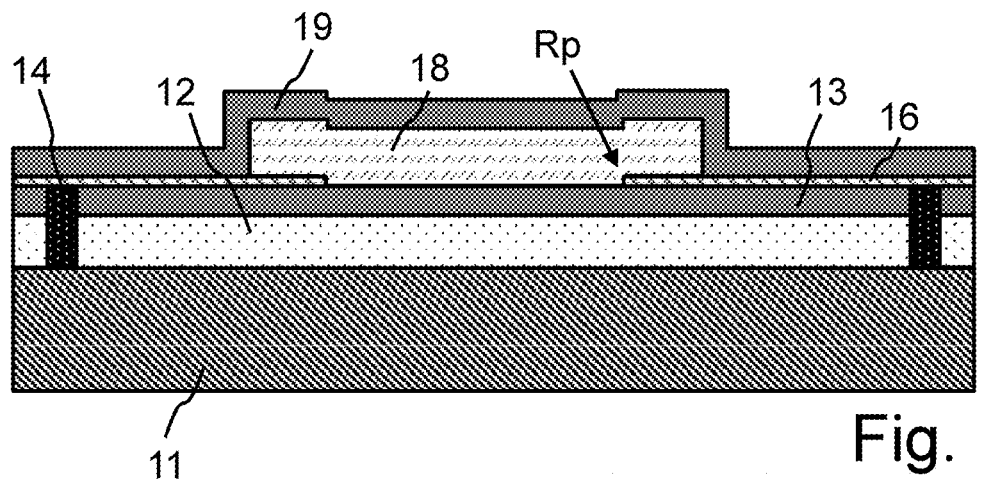
Figure 1F:
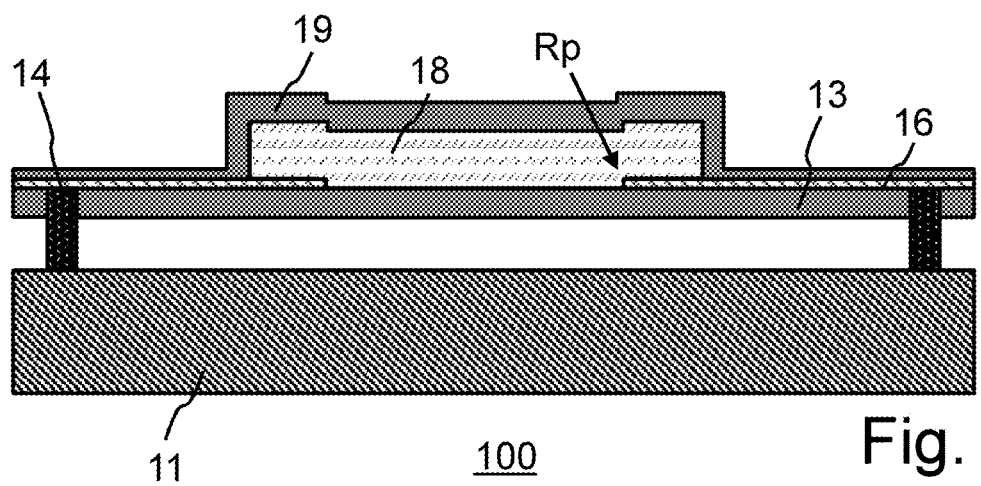

As illustrated in FIGS. 2 to 7, the forming of a microbolometer 10a-10f according to the invention comprises a first step comprising depositing a sacrificial layer 12 on a substrate 11, the latter preferably integrating a readout circuit. Layers may also be deposited on the substrate before the deposition of this sacrificial layer 12, for example, a reflector or a stop layer intended to protect the readout circuit during the step of removal of sacrificial layer 12, for example, a layer of silicon dioxide, of polyimide, or of amorphous carbon.

After the deposition of sacrificial layer 12, a support layer 13 is deposited on this sacrificial layer 12, for example, a layer inert with respect to an etching based on hydrofluoric acid intended for the subsequent removal of silicon dioxide sacrificial layer 12, that is, a support layer 13 for example made of SiC, $Al_2O_3$, AlN . . .

The nature of support layer 13 and of the possible stop layer deposited on the substrate depends on the nature of the sacrificial layer 12 used.

Similarly, the thickness of support layer 13 depends on the desired properties. For example, support layer 13 may have a thickness in the range from 10 to 100 nanometers.

As illustrated in FIGS. 2a-7a, after the deposition of support layer 13, a RIE is performed to form openings through support layer 13, sacrificial layer 12 and the possible stop layer deposited on substrate 11. These openings define the future locations of the anchoring nails 14 of microbolometer 10a-10b. For example, these openings are cylindrical and have a diameter close to 500 nanometers.

A second step comprises forming anchoring nails 14 in the openings. Anchoring nails 14 integrate a conductive material, such as titanium nitride, copper, or tungsten. As illustrated in FIGS. 2b-7b, the upper end of anchoring nails 14 may extend all the way to the level of the upper end of support layer 13. As a variant, the upper end of anchoring nails 14 may exceed in height support layer 13.

Absorber or electrode 16 is then deposited on support layer 13 and on the upper end of anchoring nails 14 to ensure an electric contact with these anchoring nails 14. For example, absorber or electrode 16 may be made of titanium nitride with a thickness in the range from 5 to 20 nanometers. To form the electrodes from this absorber or electrode 16, it is necessary to structure the latter according to the expected shape of microbolometer 10a-10b, as illustrated in FIGS. 2c-7c. There exist two major forms of microbolometers: microbolometers suspended between two anchoring nails 14 and microbolometers suspended between four anchoring nails 14.

Whatever the performed structuring of absorber or electrode 16, the invention provides depositing a dielectric layer 15 on absorber or electrode 16 and on support layer 13, as illustrated in FIGS. 2d-7d. This dielectric layer 15 may be for example made of amorphous silicon with a thickness in the range from 10 to 100 nanometers. As a variant, this dielectric layer 15 may be made of silicon nitride or of an alloy of silicon with germanium, boron, nitrogen, or carbon.

Preferably, dielectric layer 15 is selected to be made of silicon with an electric conductivity much lower than that of absorber or electrode 16. For example, a factor of at least 1,000 between the electric conductivity of dielectric layer 15 and the electric conductivity of absorber or electrode 16 may be considered. Thus, the dielectric layer may have an electric conductivity greater than 1Ω·cm.

Figure 2A:
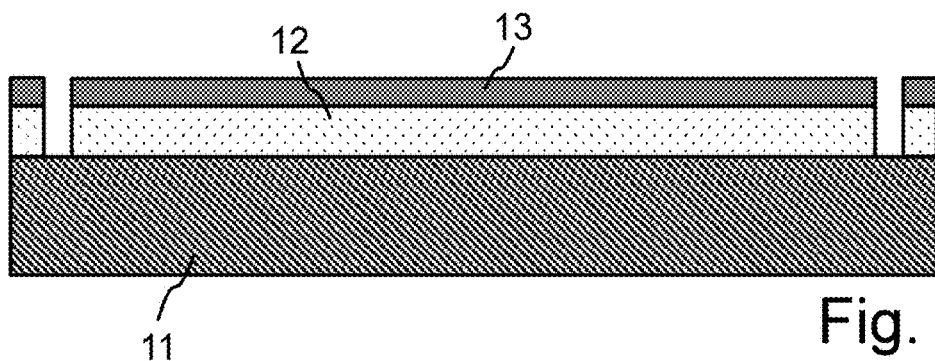
FIGS. 2a-2i illustrate the steps of the forming of a microbolometer according to a first embodiment of the invention.
Figure 2B:
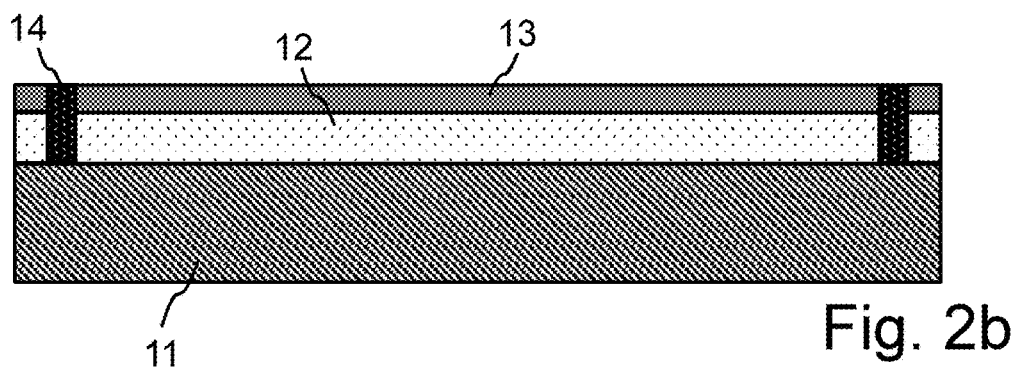
Figure 2C:
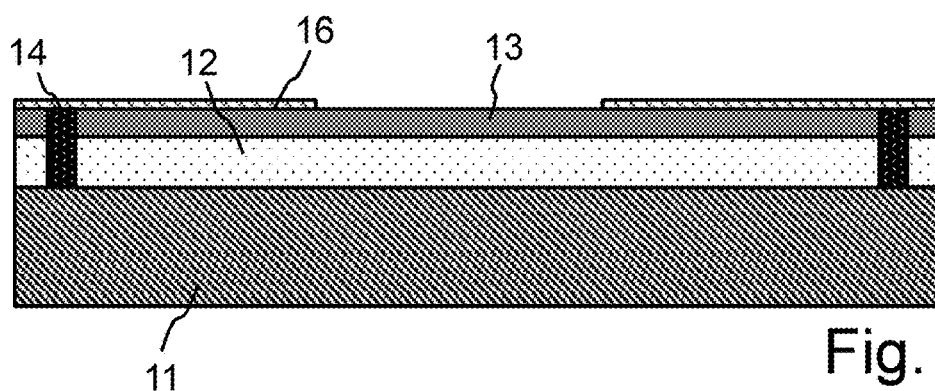
Figure 2D:
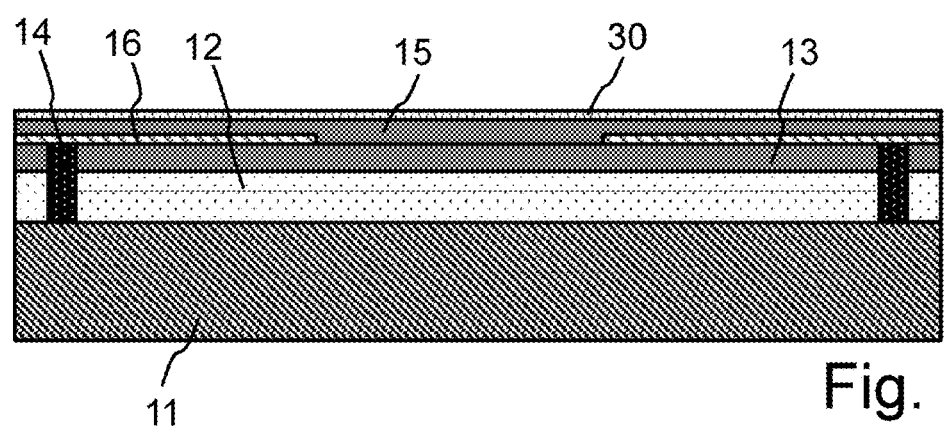

In the first embodiment of FIGS. 2a to 2i, a stop layer 30 is then deposited over the entire dielectric layer 15, as illustrated in FIG. 2d. This stop layer 30 may be made of silicon oxide or nitride with a thickness in the range from 10 to 100 nanometers.

Openings 17 are then formed through stop layer 30 and through dielectric layer 15 to reach the electrodes formed in absorber or electrode 16. These openings 17 may be formed by two successive etch steps, for example, two RIEs enabling to stop the etching on absorber or electrode 16 without degrading it.

Preferably, the width of openings 17 is smaller than 1 micrometer, typically in the range from 180 to 400 nanometers. For example, openings 17 may have a square cross-section, having a side length smaller than 400 nanometers.

Figure 2E:
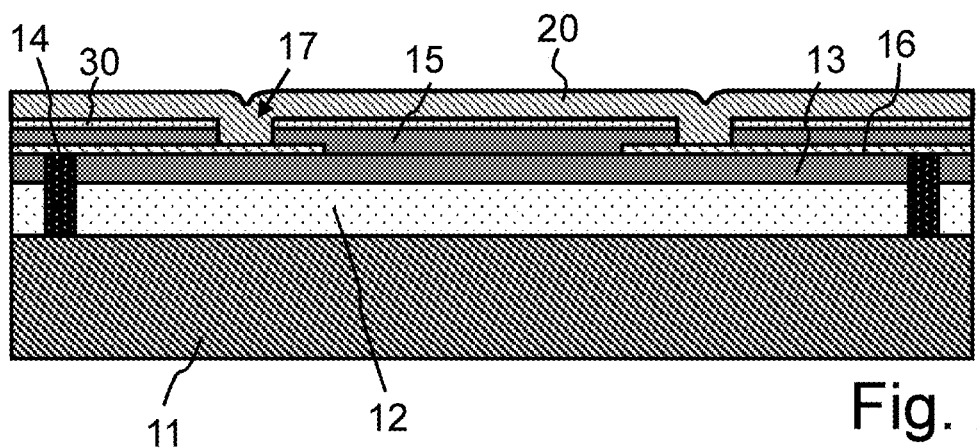

As illustrated in FIG. 2e, a conformal vapor deposition of a conductive material 20 is then performed on stop layer 30 and in openings 17 to fill these openings 17, for example, by a CVD or PVD. Preferably, conductive material 20 is made of tungsten or of tungsten silicide, and the thickness of this deposition is in the range from 100 to 300 nanometers. To guarantee the filling of openings 17, the thickness of deposition of conductive material 20 is preferably greater than half the width of openings 17. The filling of openings 17 may also be obtained by the deposition of a thin titanium nitride layer, deposited by a chemical vapor deposition, followed by the CVD or PVD of conductive material 20. Thus, a titanium nitride with a thickness in the range from 10 to 50 nanometers may be used to form the outer walls of the conductive vias.

When openings 17 are totally filled with a conductive material 20, the latter is removed from openings 17 to form a planar surface Sp intended for the deposition of a thermometric or thermoresistive material 21.

Figure 2F:
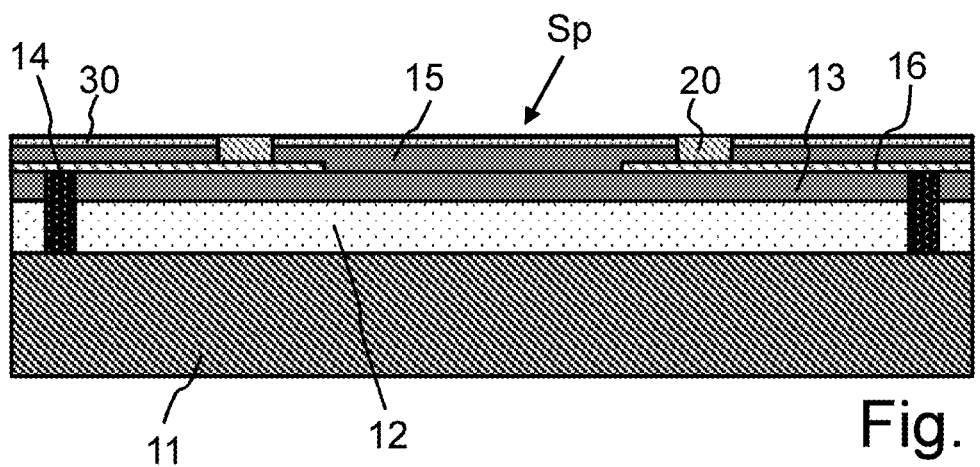

In the embodiment of FIGS. 2a to 2i, the removal of the conductive material 20 is performed by chemical-mechanical polishing of conductive material 20 all the way to the level of the upper end of stop layer 30, as illustrated in FIG. 2f. Conductive material 20 thus forms conductive vias. The planar surface Sp intended for the deposition of thermometric or thermoresistive material 21 is then formed by stop layer 30 and the upper end of the conductive vias. The chemical-mechanical polishing of tungsten may be performed by an aqueous solution made of abrasive elements based on silica or alumina particles, of an oxidizing element, such as hydrogen peroxide, and of a catalyst such as iron nitrate.

As a variant, it is possible to modify the chemical-mechanical polishing method to continue the etching of conductive material 20 after having reached the upper end of stop layer 30. For example, it is possible to implement said chemical-mechanical polishing so that the etching of said conductive material 20 at the level of openings 17 stops substantially at the level of the upper end of dielectric layer 15. Thus, stop layer 30 may be removed to obtain a planar surface formed by dielectric layer 15 and the upper end of the conductive vias.

Figure 3A:
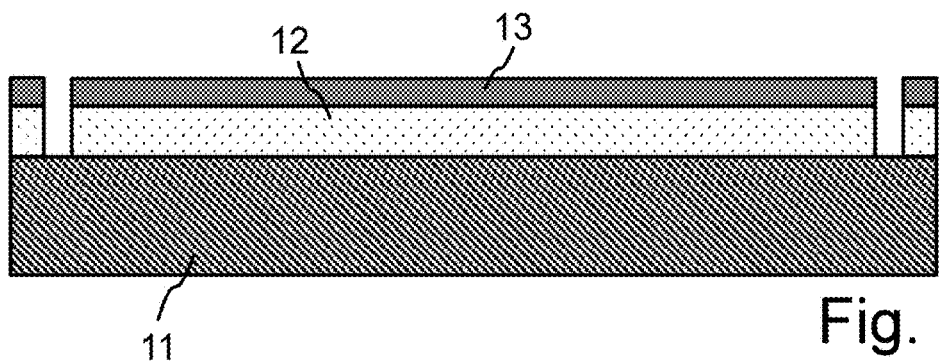
FIGS. 3a-3i illustrate the steps of the forming of a microbolometer according to a second embodiment of the invention.
Figure 3B:
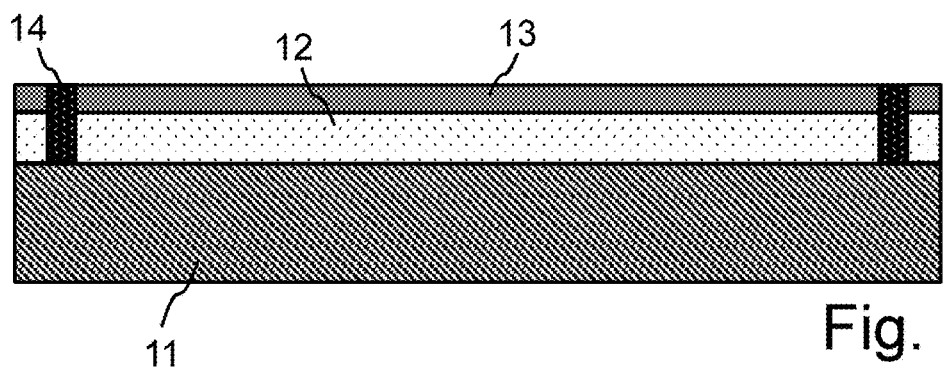
Figure 3C:
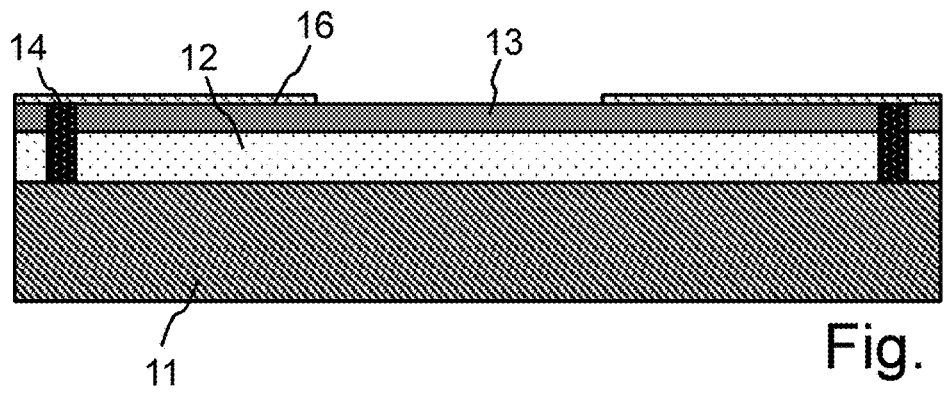
Figure 3D:
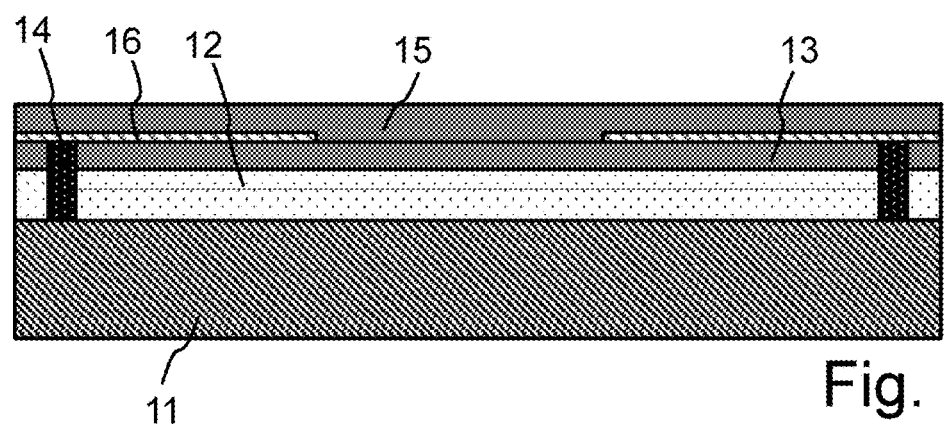
Figure 3E:
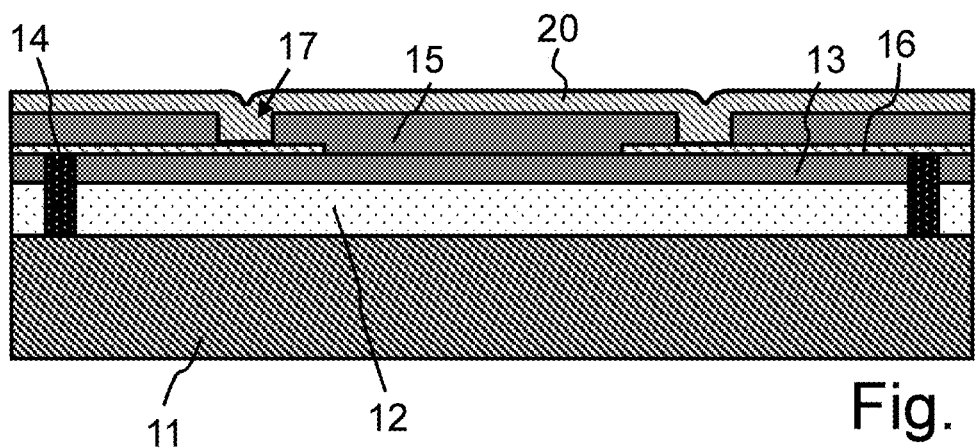

According to a variant of this embodiment, illustrated in FIGS. 3a to 3i, it is possible to form openings 17 directly in dielectric layer 15 without using a stop layer 30. Thus, conductive material 20 is directly deposited on dielectric layer 15 and inside of openings 17, as illustrated in FIG. 3e.

Figure 3F:
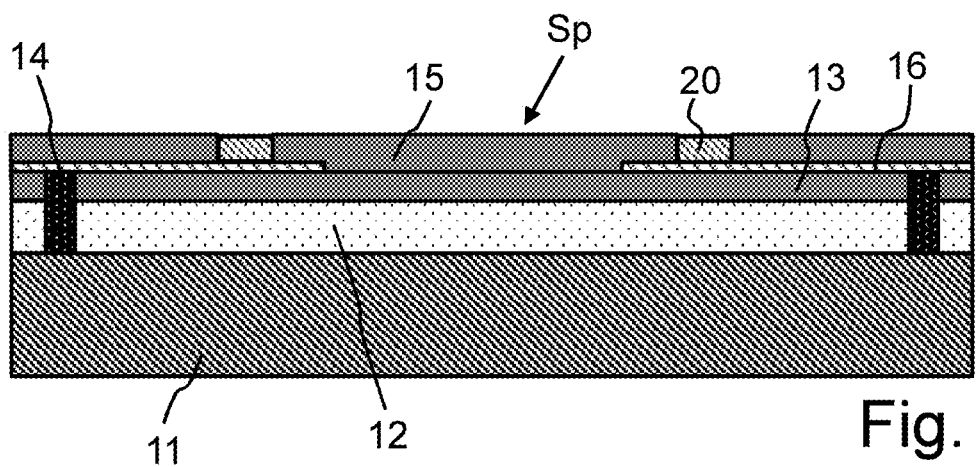

As illustrated in FIG. 3f, the removal of conductive material 20 from openings 17 to form a planar surface Sp may be performed by means of a RIE of conductive material 20 stopping on dielectric layer 15, by means of a chemical-mechanical polishing stopping on dielectric layer 15, or by means of an association of a chemical-mechanical polishing stopping just next to dielectric layer 15 followed by a RIE stopping on dielectric layer 15.

In the two embodiments of FIGS. 2a-2i and 3a-3i, conductive vias 20 are thus obtained by deposition of a conductive material. As a variant, as described in the embodiments of FIGS. 4 to 7, conductive vias 20 may be formed by transforming a local portion of dielectric layer 15.

Thus, in a third embodiment illustrated in FIGS. 4a-4k, a siliciding of dielectric layer 15 is obtained by incorporation of a metal siliciding material 50 with a dielectric layer 15 based on silicon. For example, dielectric layer 15 may be made of amorphous silicon and the metal siliciding material 50 may be made of nickel or cobalt and possibly with added platinum, to form nickel silicide.

Figure 4A:
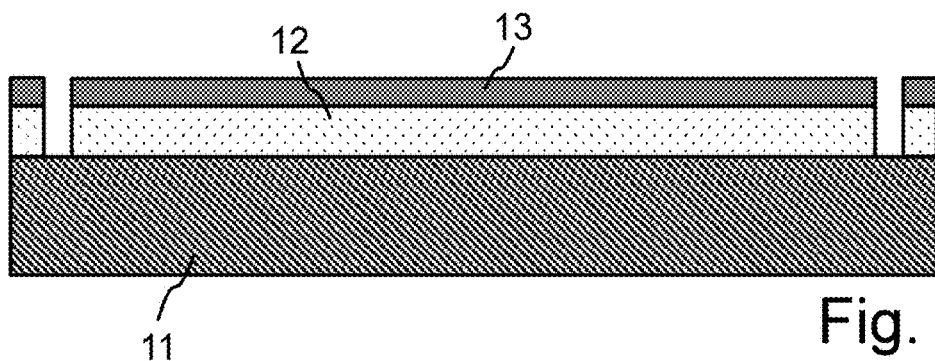
FIGS. 4a-4k illustrate the steps of the forming of a microbolometer according to a third embodiment of the invention.
Figure 4B:
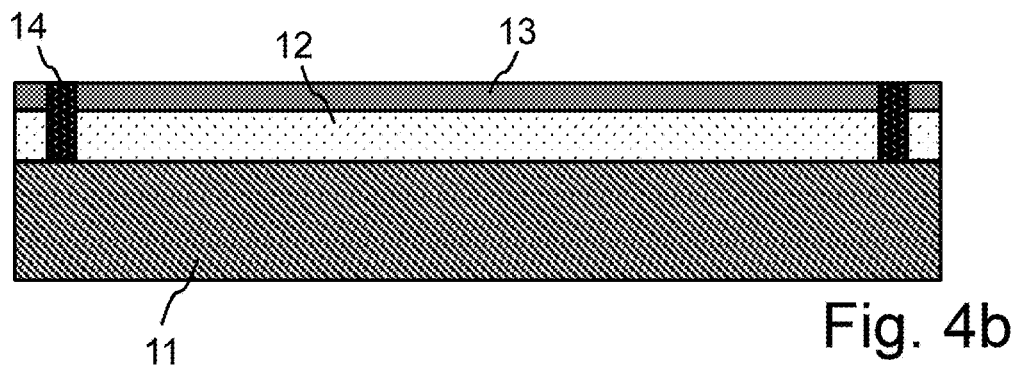
Figure 4C:
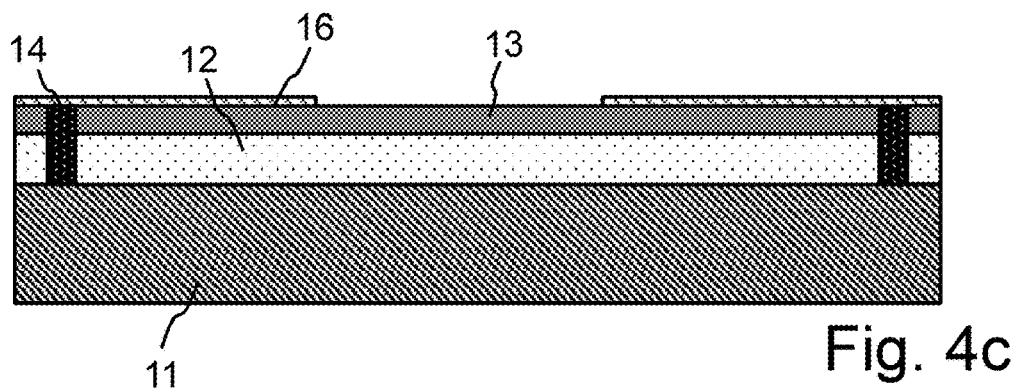
Figure 4D:
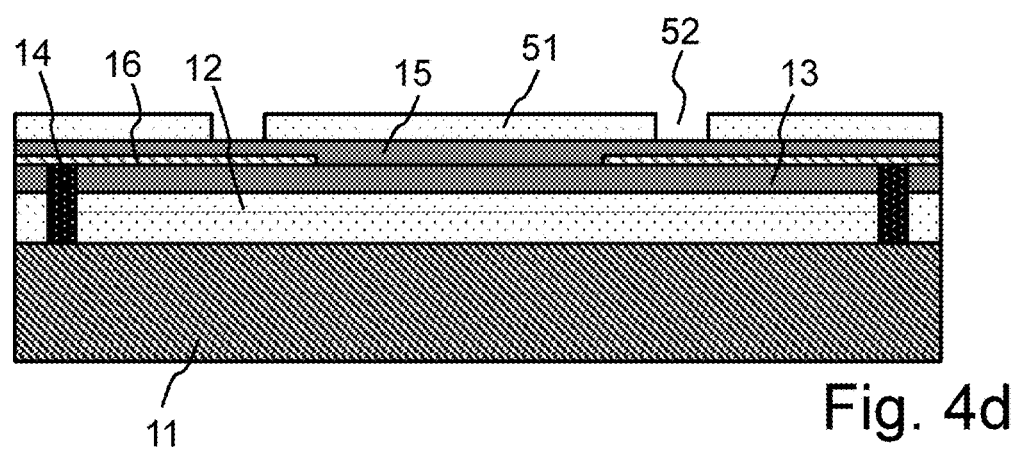

To obtain a local deposition of the metal siliciding material 50, a sacrificial layer 51 may be deposited on dielectric layer 15, and openings 52 may be structured in this sacrificial layer 51 to reach dielectric layer 15, as illustrated in FIG. 4d. Sacrificial layer 51 may be made of silicon oxide or of silicon nitride with a thickness in the range from 5 to 50 nanometers. Openings 52 may be structured by photolithography and reactive ion etching.

Figure 4E:
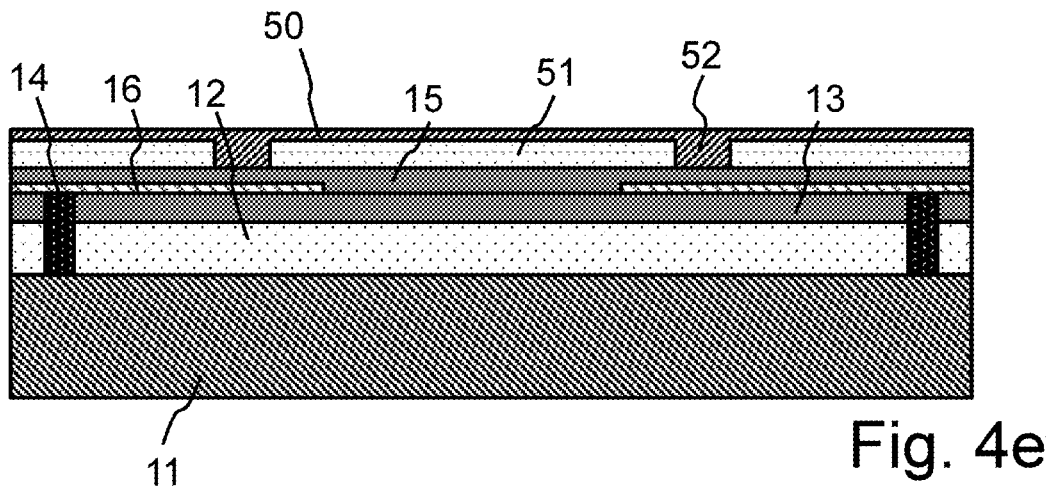

As illustrated in FIG. 4e, metal siliciding material 50 may then be deposited on sacrificial layer 51 and into openings 52. For example, metal siliciding material 50 may be deposited with a thickness in the range from 5 to 50 nanometers.

Figure 4F:
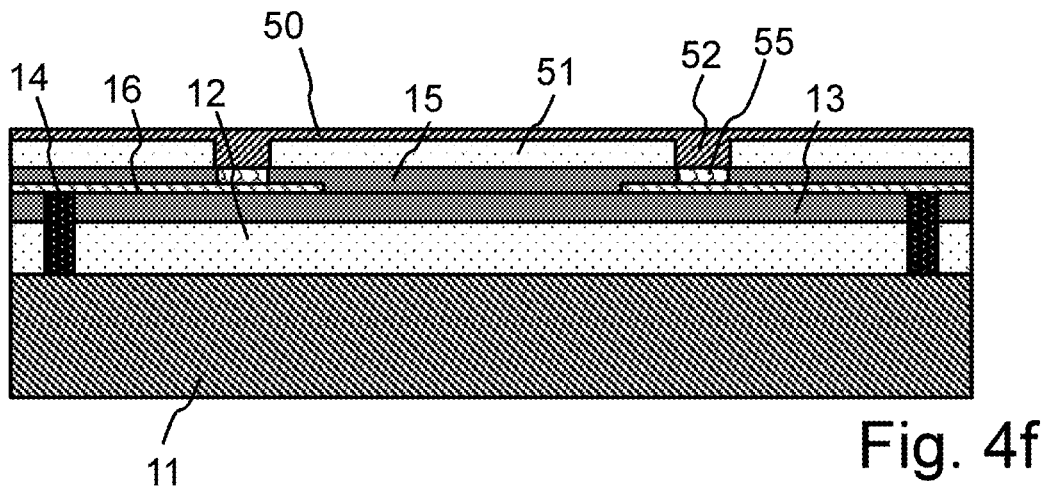

The incorporation of metal siliciding material 50 with dielectric layer 15 may then be performed by a diffusion step obtained by thermal anneal, with a temperature in the range from 100° C. to 200° C. for a time period of at least 30 seconds. As illustrated in FIG. 4f, this thermal anneal enables to obtain an area 55 of dielectric layer 15 where at least part of the atoms of metal siliciding material 50 are present.

Figure 4G:
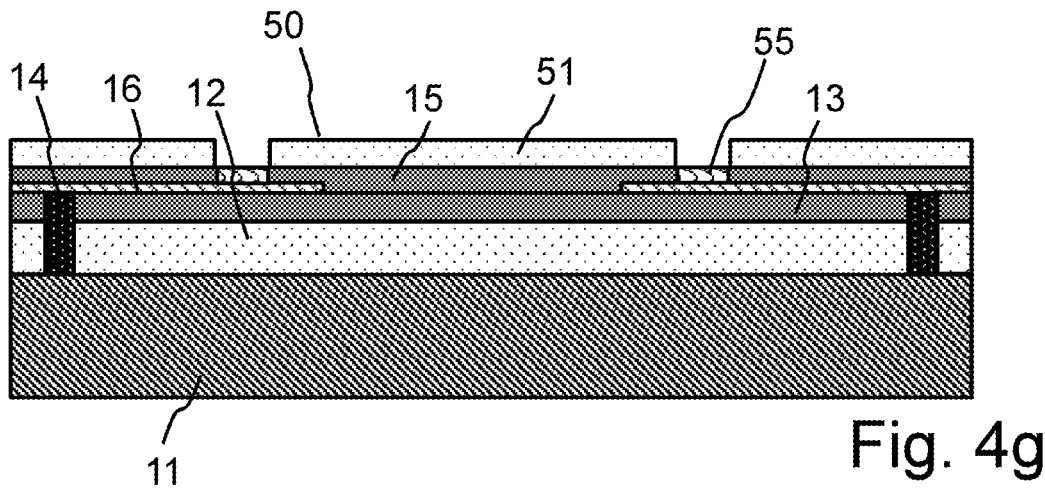

As illustrated in FIG. 4g, when the diffusion of the metal siliciding material 50 is performed, it is possible to remove the metal siliciding material 50 which has not diffused in dielectric layer 15, that is, outside of the useful siliciding areas. For this purpose, a wet etching based on hydrochloric acid, hydrogen peroxide, hydrofluoric acid, hydrobromic acid, sulfuric acid, or phosphoric acid may be implemented.

Figure 4H:
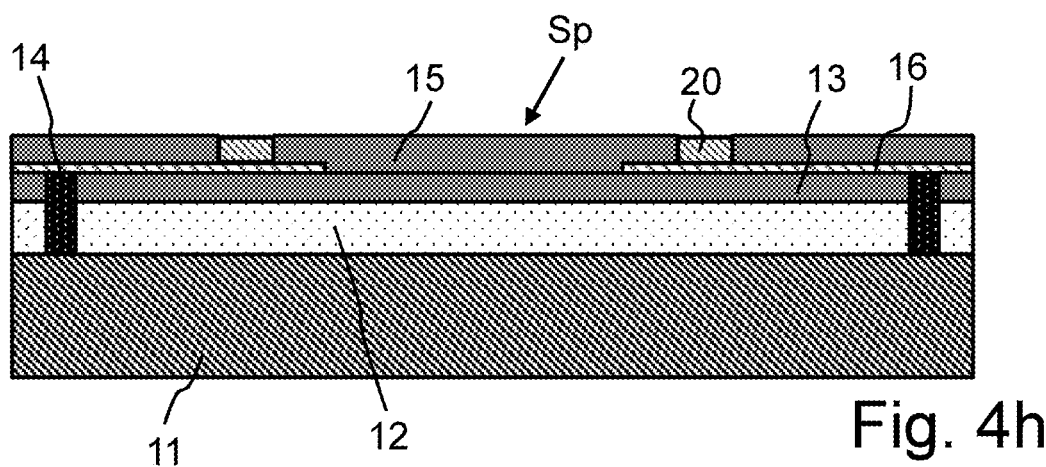
Figure 4I:
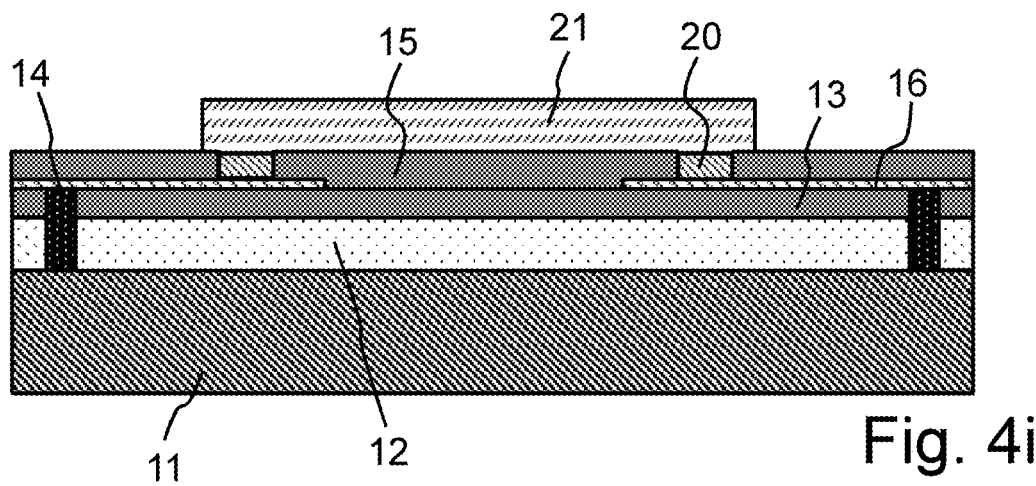
Figure 4J:
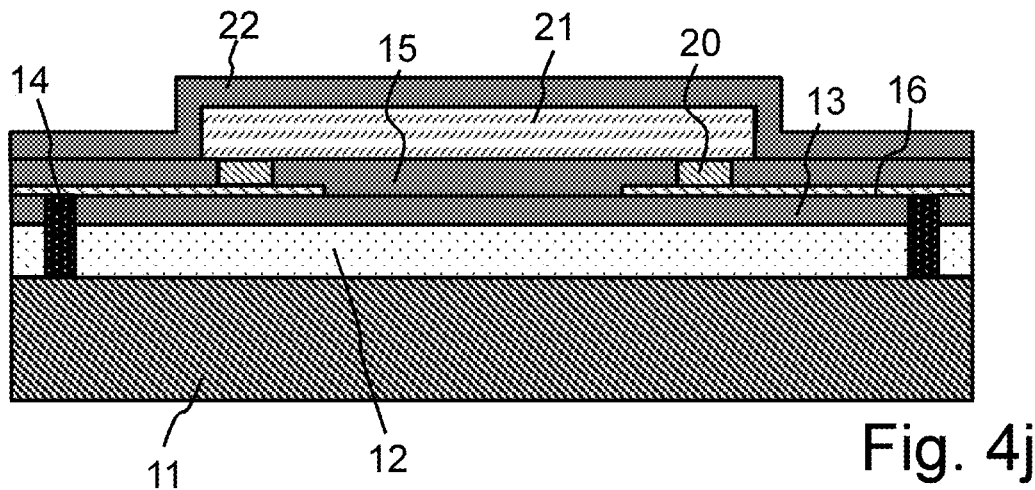
Figure 4K:
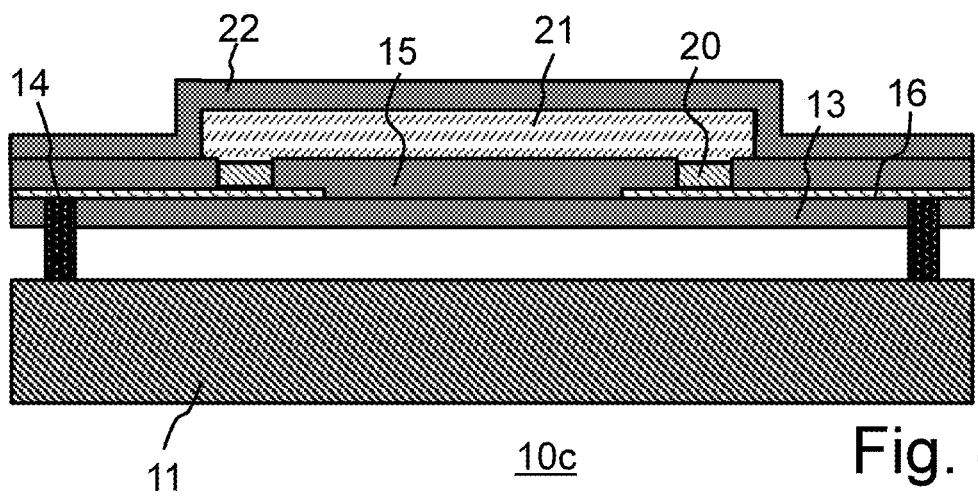

Sacrificial layer 51 can then be removed, as illustrated in FIG. 4h. For this purpose, an etching based on hydrofluoric acid may be implemented since this etching is highly selective over a dielectric layer made of amorphous silicon. As a variant, it is possible to directly remove the metal siliciding material 50 which has not diffused at the same time as sacrificial layer 51.

Conductive vias 20 being formed inside of dielectric layer 15, the flatness of this dielectric layer 15 is kept and the thermometric or thermoresistive material 21 may be deposited on a planar surface Sp. Thus, the consecutive steps of the forming method of this third embodiment are similar to those previously described in relation with the first and second embodiments.

The thermal anneal may however generate a partial over-thickness of dielectric layer 15. To anticipate this overthickness, it is possible to locally etch dielectric layer 15 before depositing metal siliciding material 50.

Figure 5A:
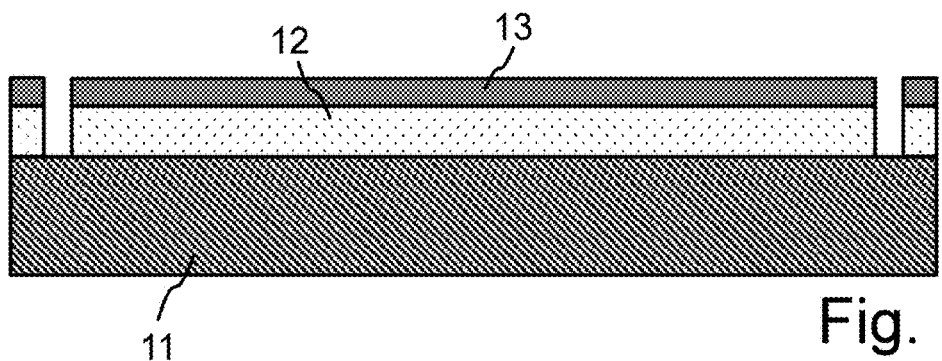
FIGS. 5a-5l illustrate the steps of the forming of a microbolometer according to a fourth embodiment of the invention.
Figure 5B:
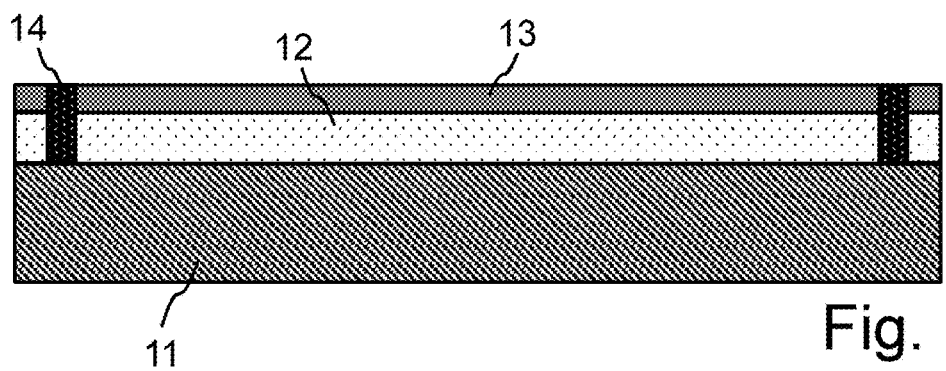
Figure 5C:
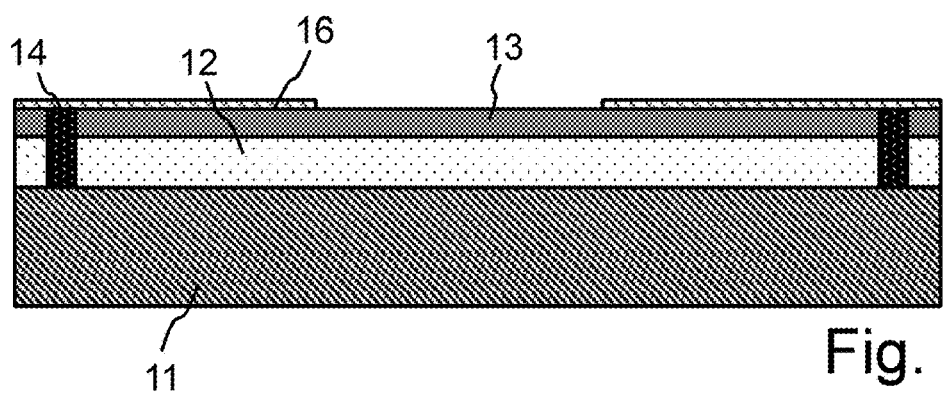
Figure 5D:
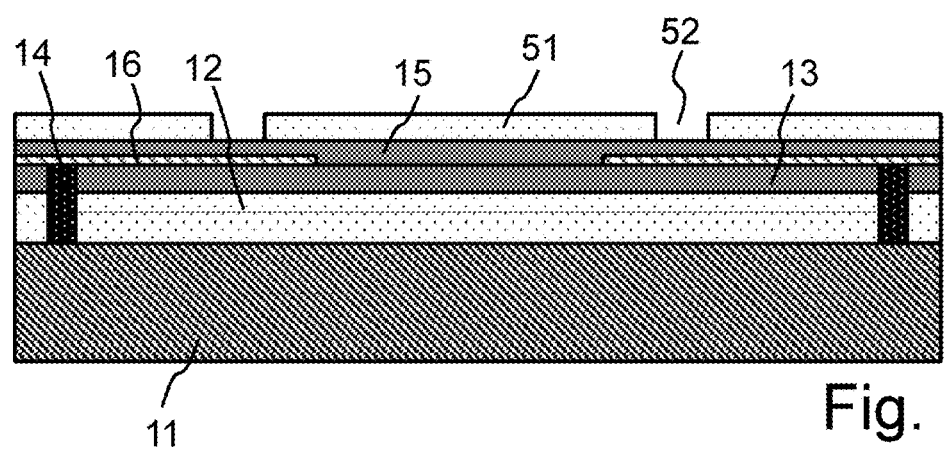
Figure 5E:
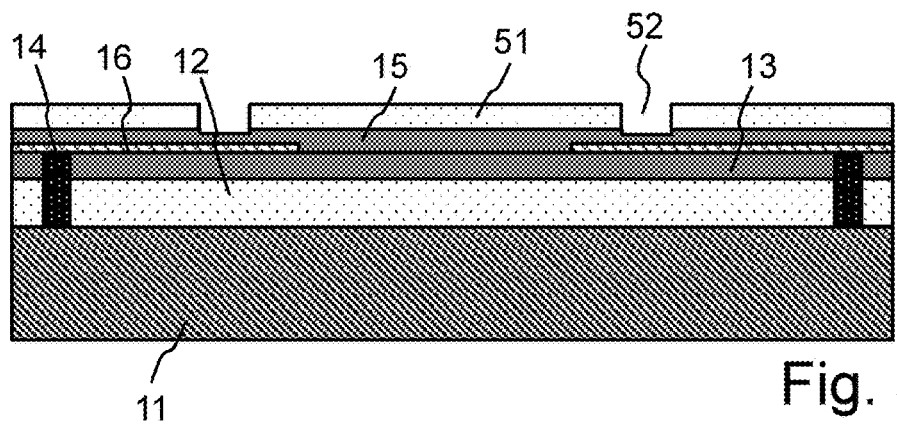
Figure 5F:
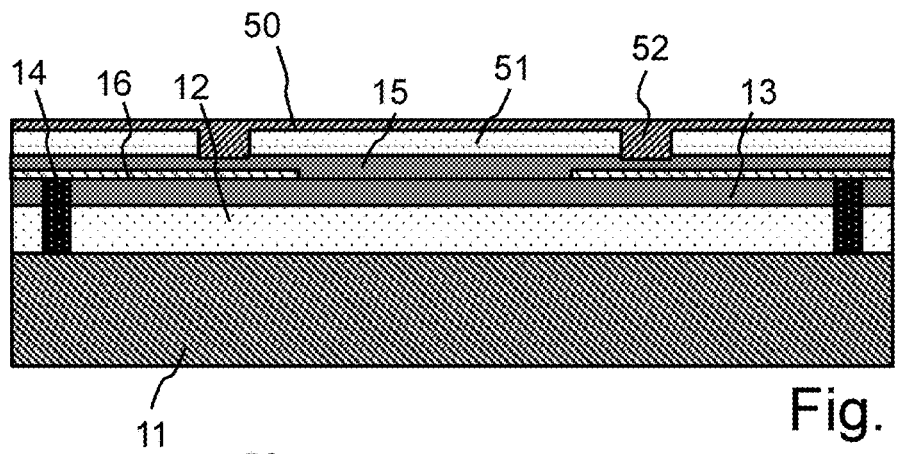
Figure 5G:
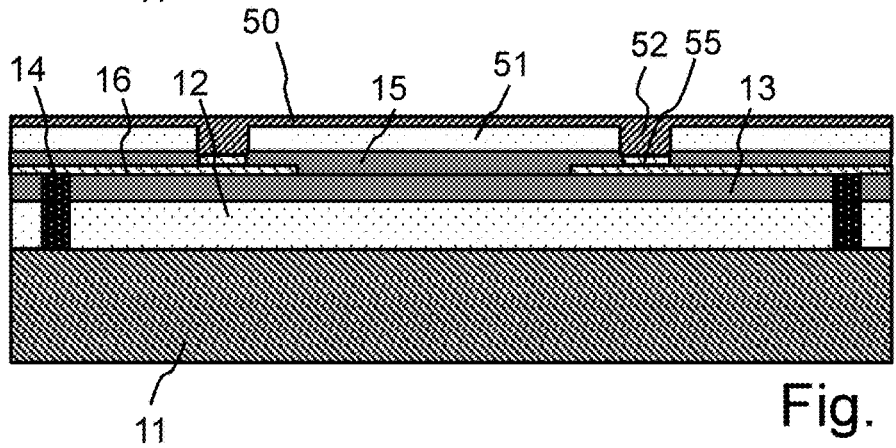
Figure 5H:
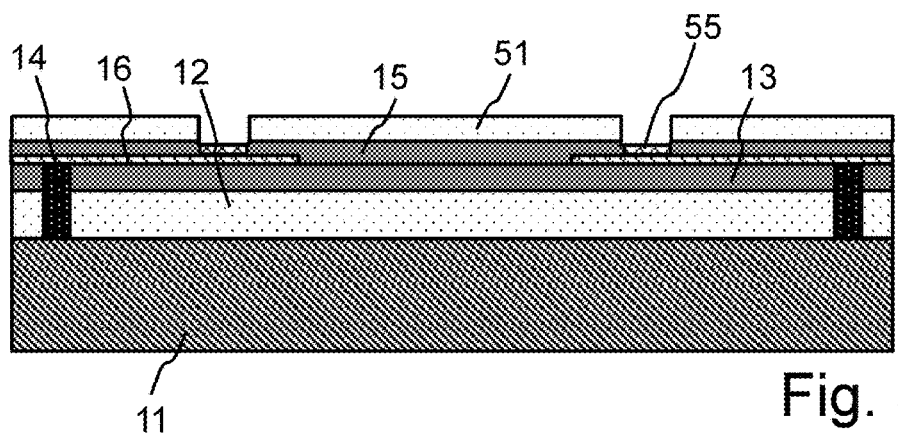
Figure 5I:
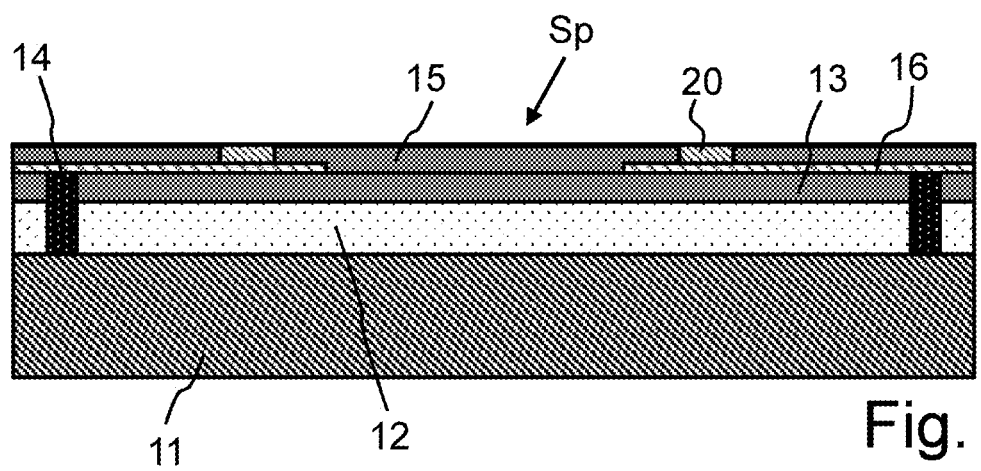
Figure 5J:
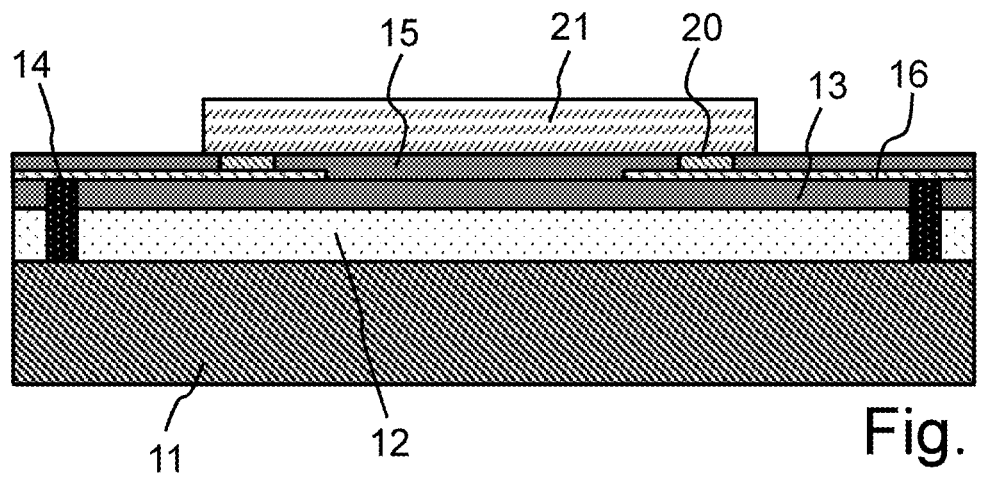
Figure 5K:
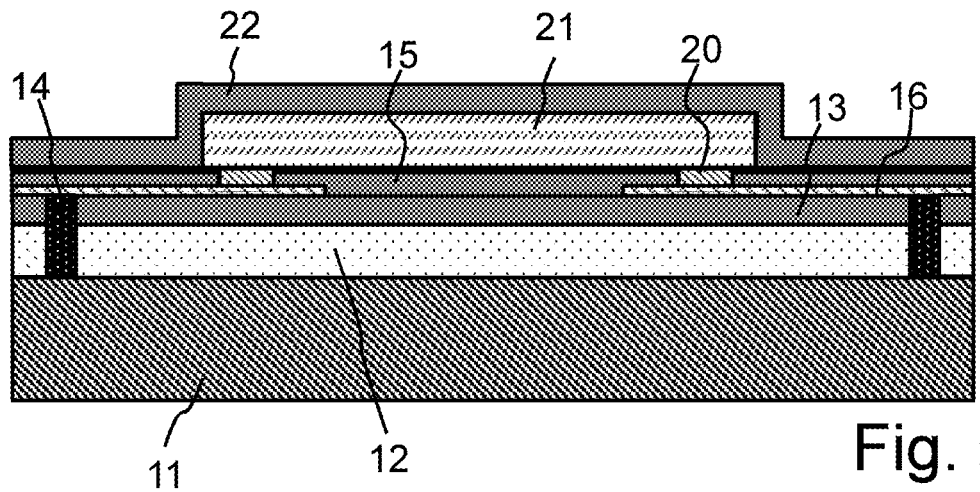
Figure 5L:
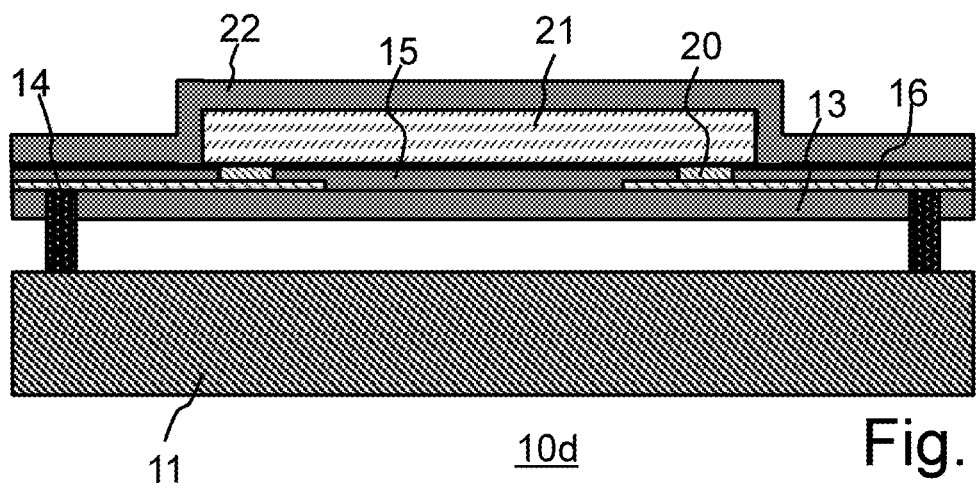

Thus, in a fourth embodiment, illustrated in FIGS. 5a to 5j, this partial etching is performed after the forming of openings 52 in sacrificial layer 51, as illustrated in FIG. 5e. This partial etching may have a depth in the range from 1 to 5 nanometers. The next steps, illustrated in FIGS. 5f to 5l, then correspond to the steps illustrated in FIGS. 4e to 4k. This etch depth is controlled by the etch time, knowing the etch speed of the method used.

Figure 6A:
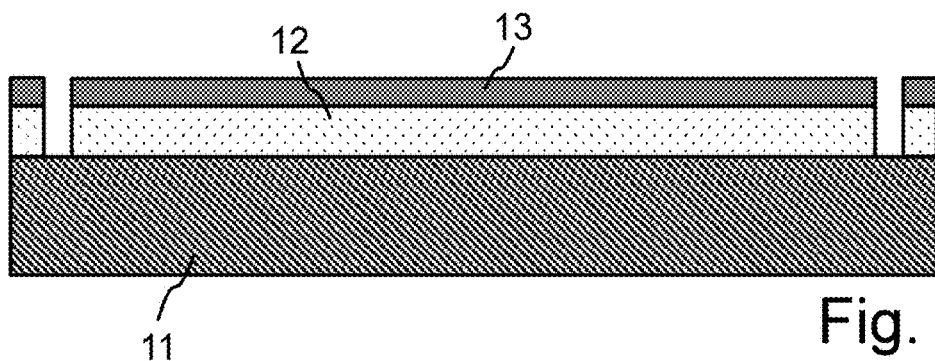
FIGS. 6a-6i illustrate the steps of the forming of a microbolometer according to a fifth embodiment of the invention.
Figure 6B:
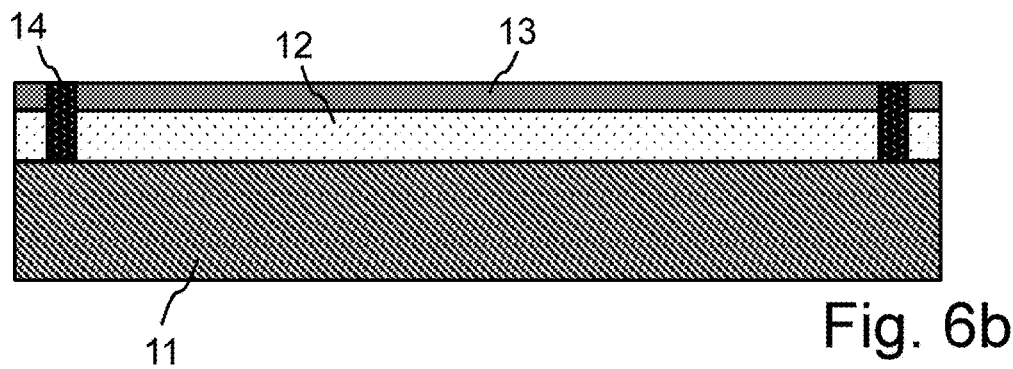
Figure 6C:
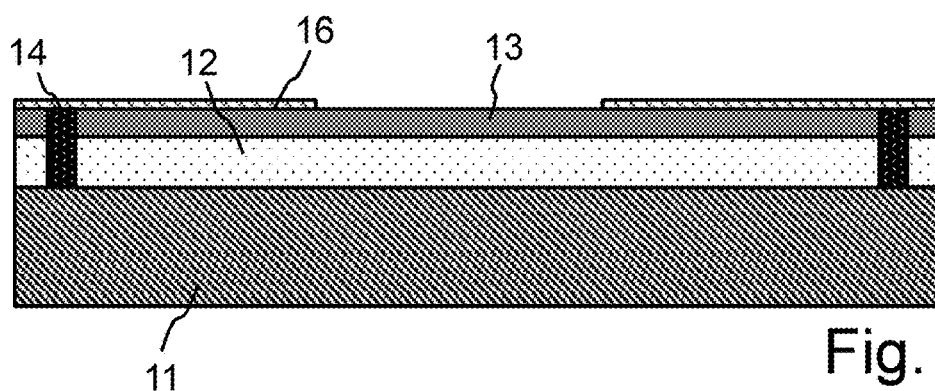
Figure 6D:
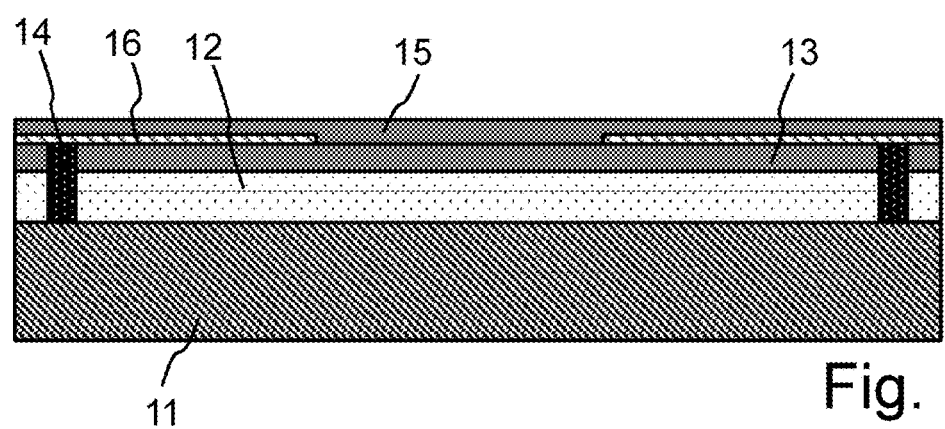
Figure 6E:
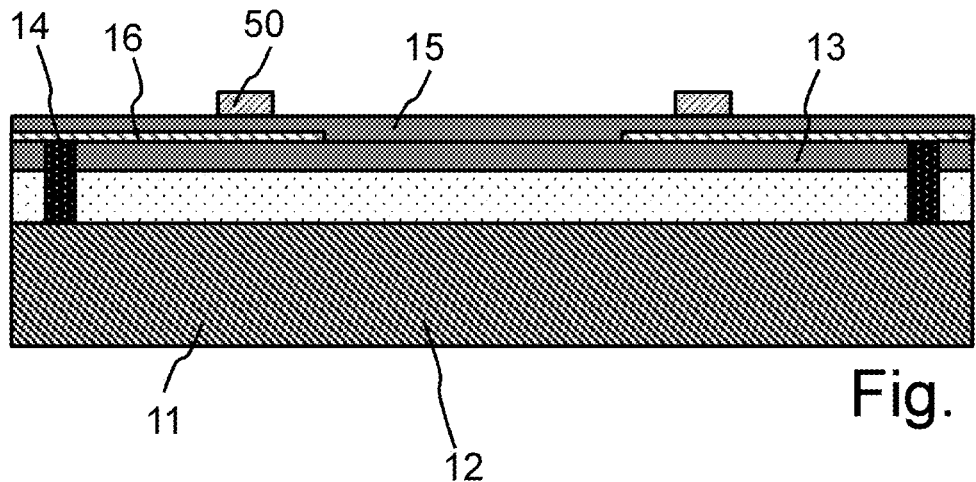
Figure 6F:
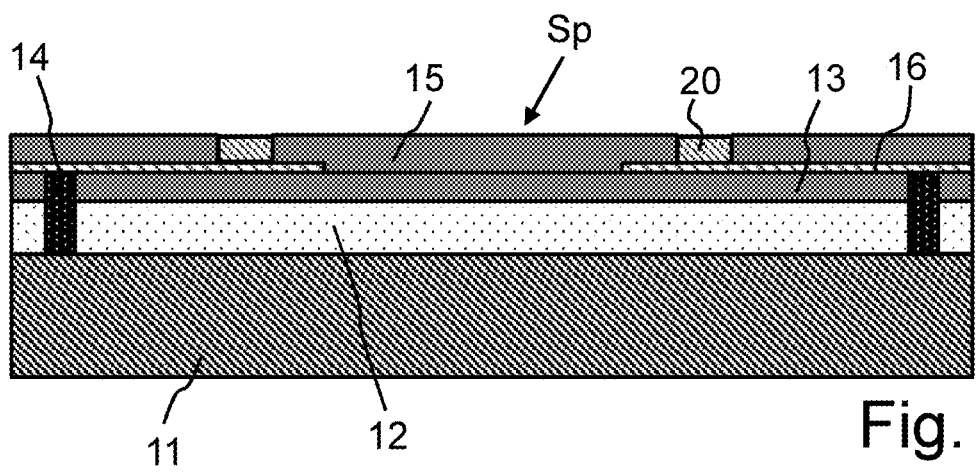
Figure 6G:
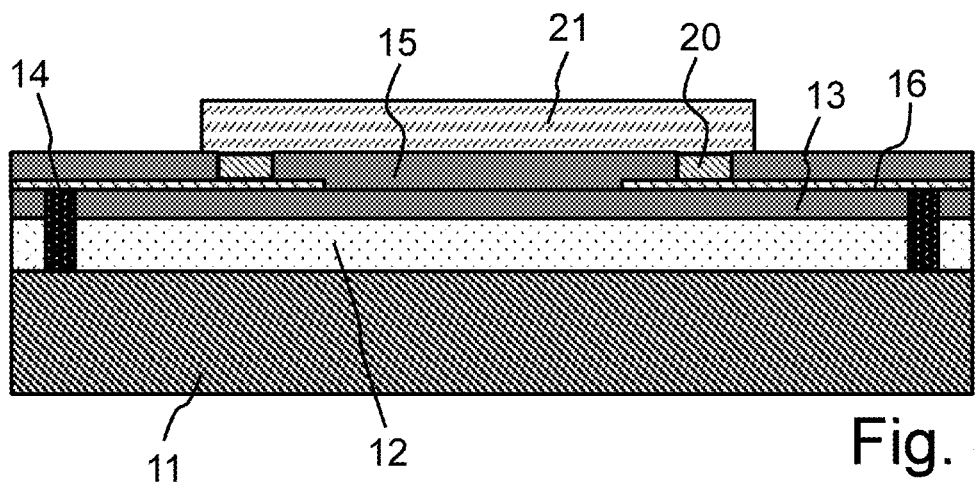
Figure 6H:
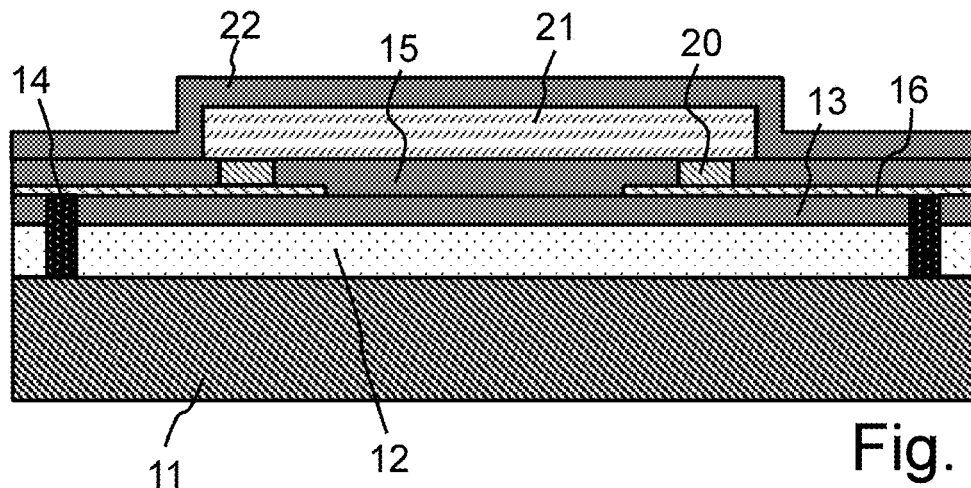
Figure 6I:
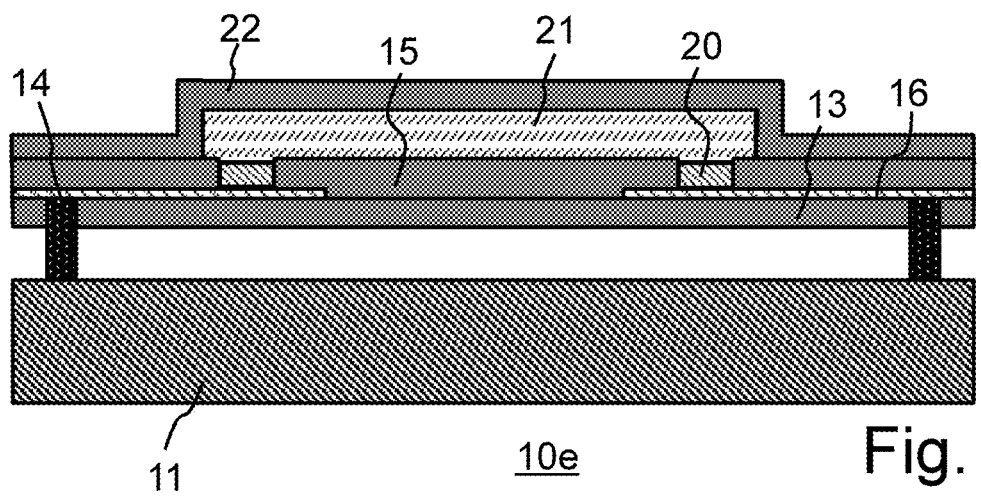

As a variant, the local deposition of metal siliciding material 50 may be obtained by a photolithography step, a step of deposition of metal siliciding material 50, followed by a resin removal step. Thus, in the fifth embodiment illustrated in FIGS. 6a to 6i, this local deposition is illustrated in FIG. 6e. A phase of thermal anneal with a temperature in the range from 350° C. to 450° C. for a time period in the range from 30 s to 1 min may then be used to obtain the forming of conductive vias 20, as illustrated in FIG. 6f. Preferably, the duration of the thermal anneal is at least greater than 30 s.

In the embodiments of FIGS. 4 to 6, conductive vias 20 are thus obtained by siliciding of a local portion of dielectric layer 15.

According to a sixth embodiment of FIGS. 7a to 7i, conductive vias 20 may be formed by ion implantation of a metal element in a local portion of dielectric layer 15.

Figure 7A:
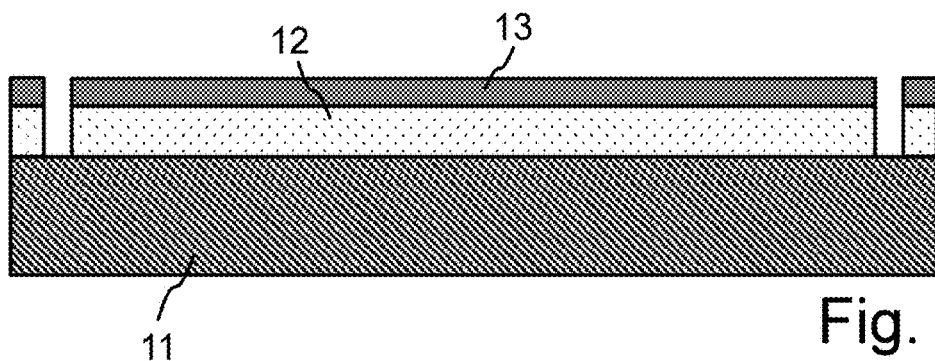
FIGS. 7a-7i illustrate the steps of the forming of a microbolometer according to a sixth embodiment of the invention.
Figure 7B:
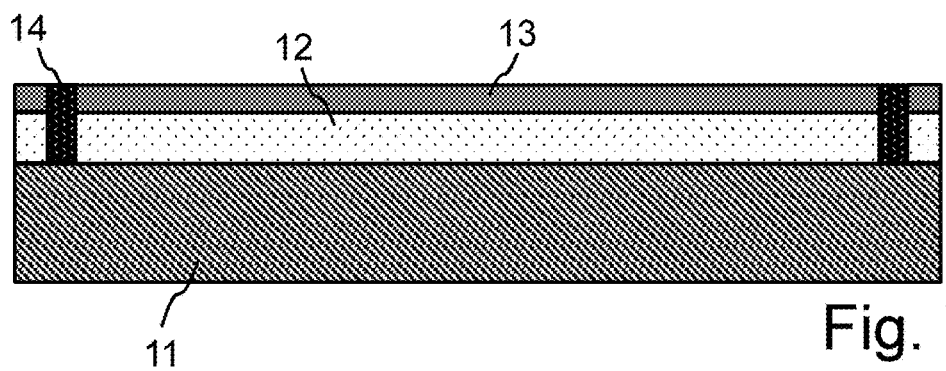
Figure 7C:
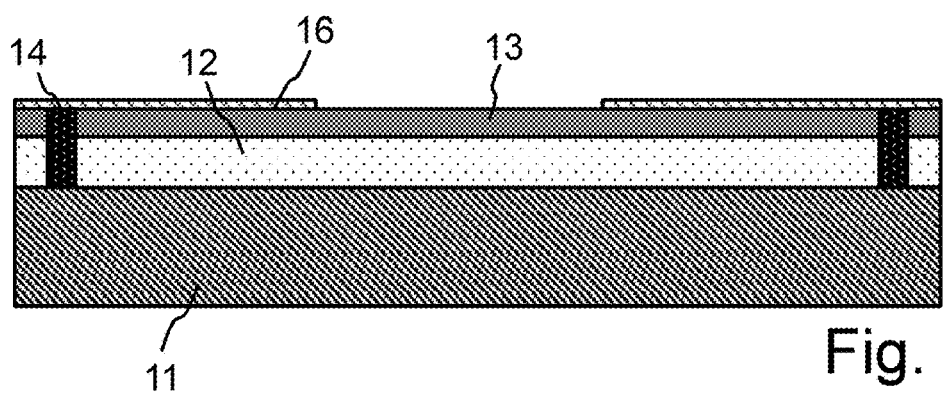
Figure 7D:
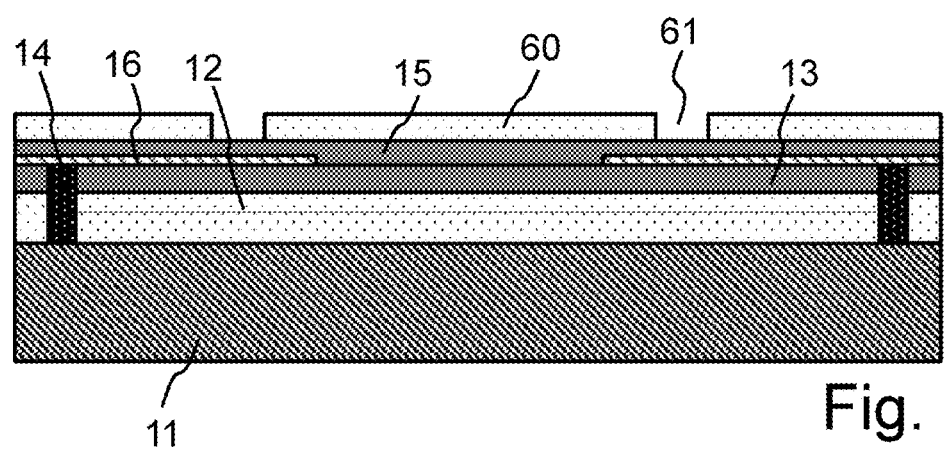

For this purpose, a masking layer 60 is used to delimit the portion of dielectric layer 15 intended to receive the ion implantation. Openings 61 are then formed in this masking layer 60, as illustrated in FIG. 7d.

Figure 7E:
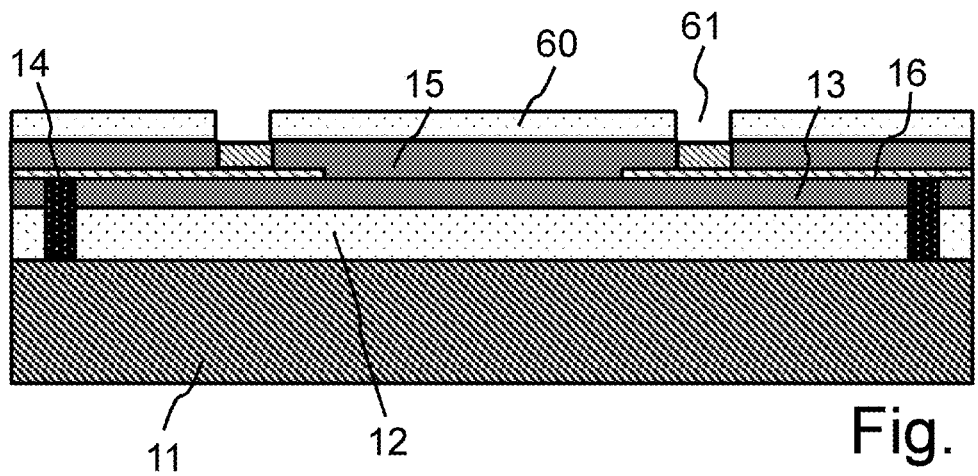

As illustrated in FIG. 7e, an ion implantation is then performed by using ions of a metal element to sufficiently degenerate dielectric layer 15 at the level of openings 61 so that it becomes locally conductive. The ion implantation may comprise a step of thermal anneal of the metal element.

As a variant, it is also possible to perform a plurality of successive implantations having different ion acceleration voltages. Preferably, these successive implantations are performed with a fixed or very slightly variable ion beam current. The variation of the ion acceleration voltages may be obtained, for example, by variation of a bias voltage. Here again, the ion implantations may comprise a step of thermal anneal of the metal element.

This ion implantation may be performed by a doping technique conventionally used for the forming of semiconductors. For example, the metal element may be made of nickel, titanium, manganese, cobalt, or aluminum.

Further, this ion implantation enables to use a large variety of possible dielectric layers 15. For example, dielectric layer 15 may be made of silicon nitride, of silicon oxide, of silicon oxynitride, or of an alloy of silicon with germanium, boron, nitrogen, or carbon.

Figure 7F:
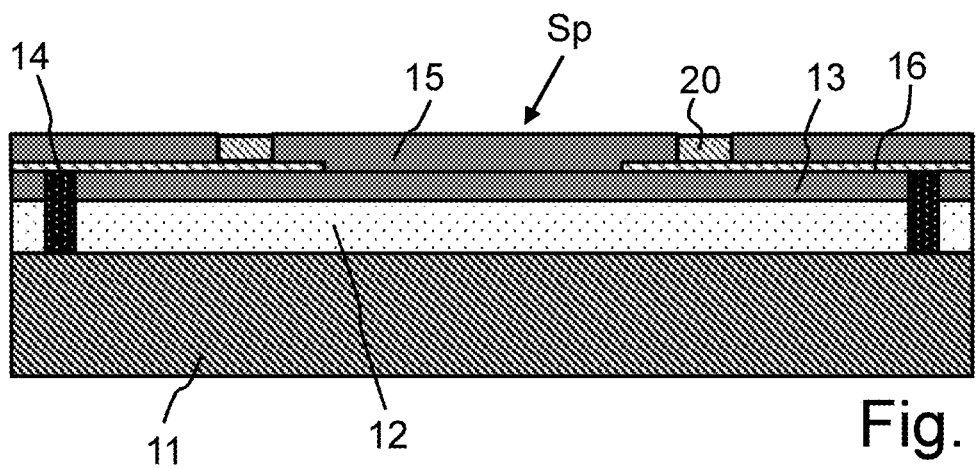
Figure 7G:
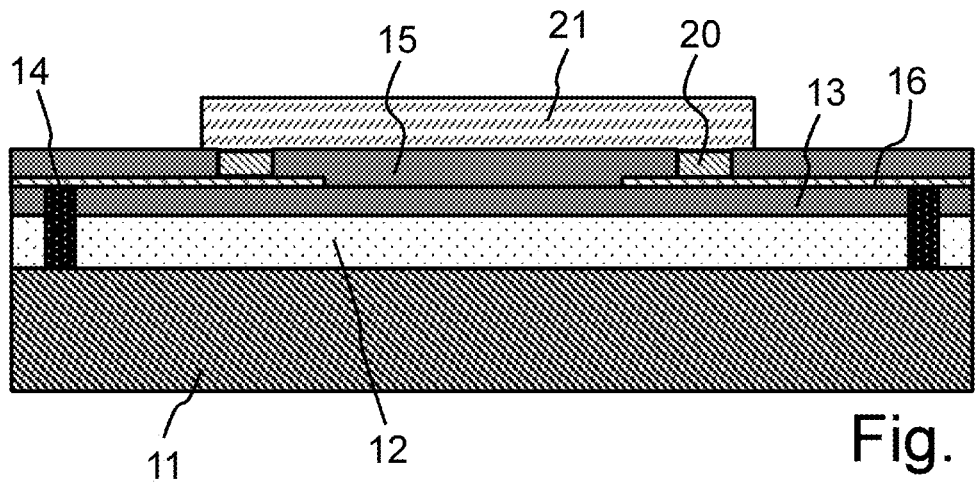
Figure 7H:
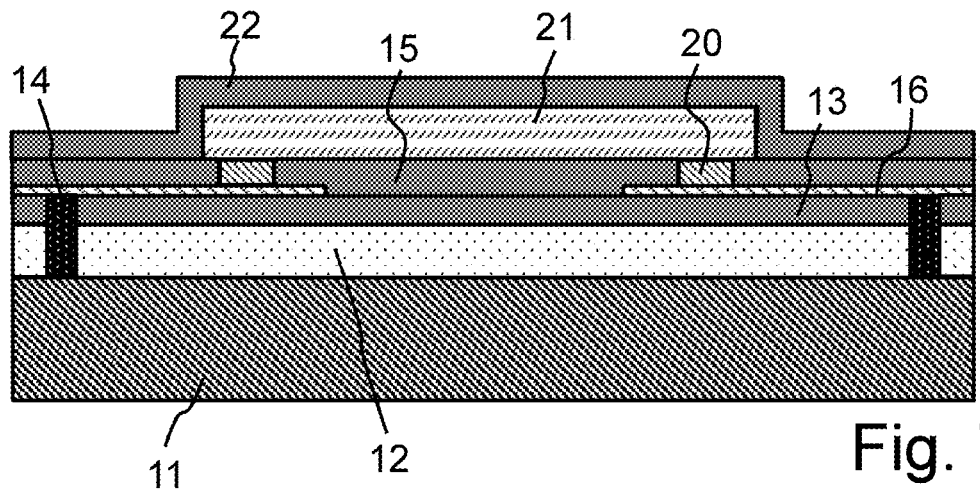
Figure 7I:
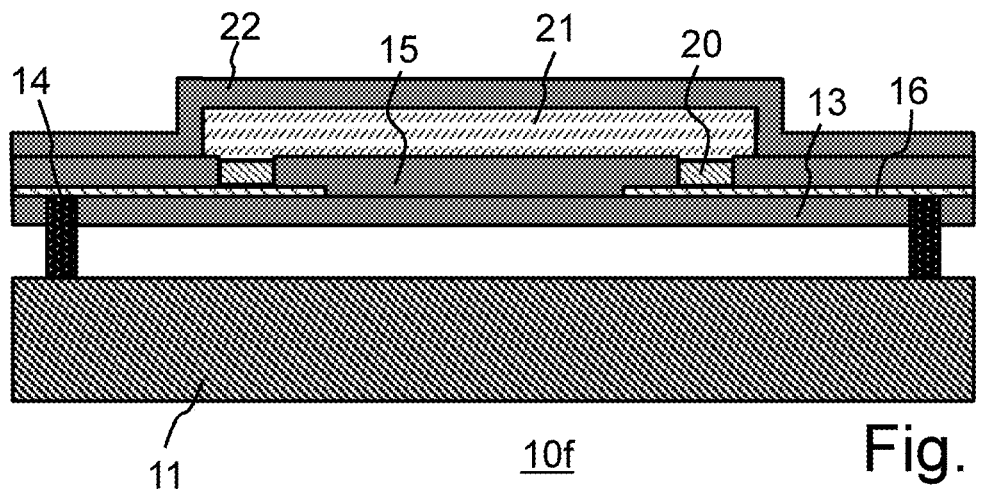

After this ion implantation, masking layer 60 may then be removed, via usual techniques of resin removal by wet or dry etching, as illustrated in FIG. 7f.

Figure 2G:
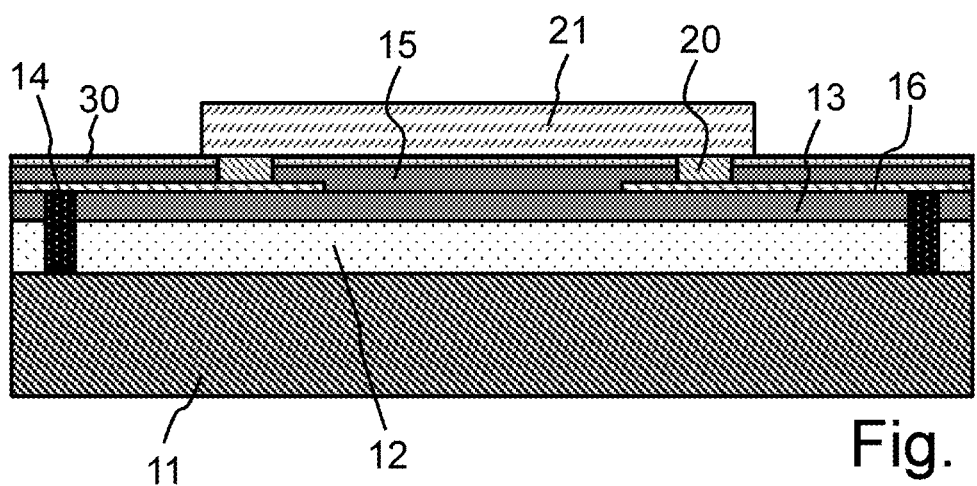
Figure 2H:
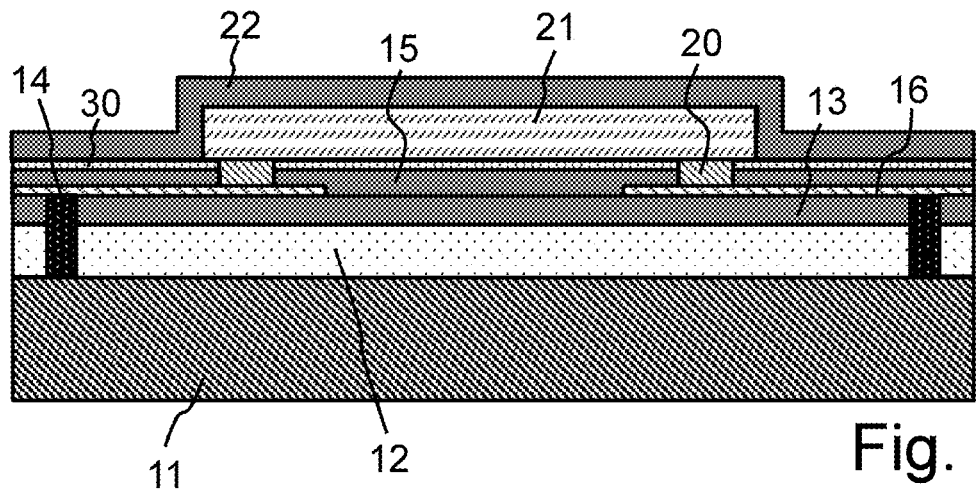
Figure 2I:
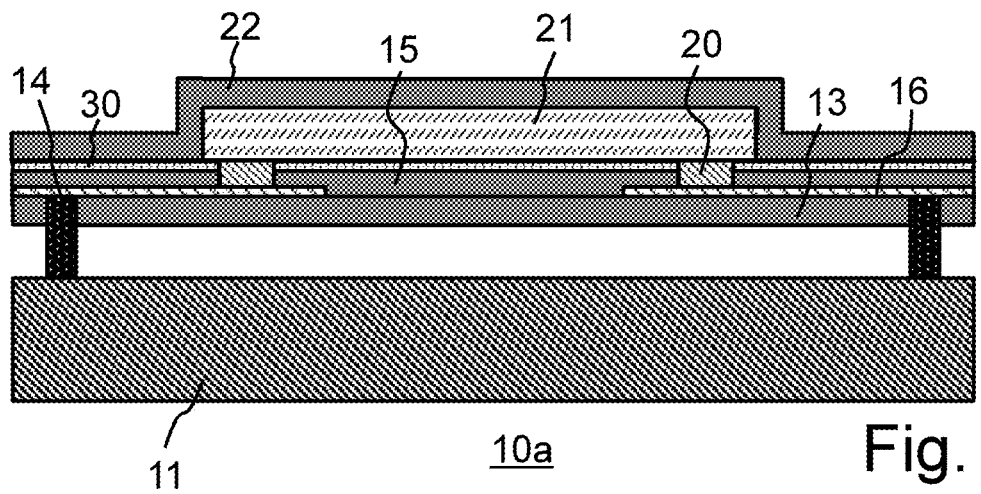
Figure 3G:
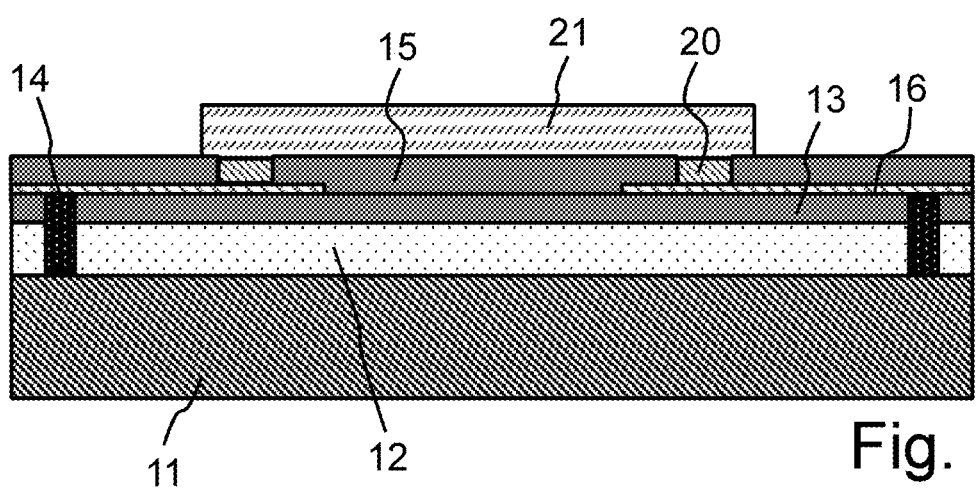
Figure 3H:
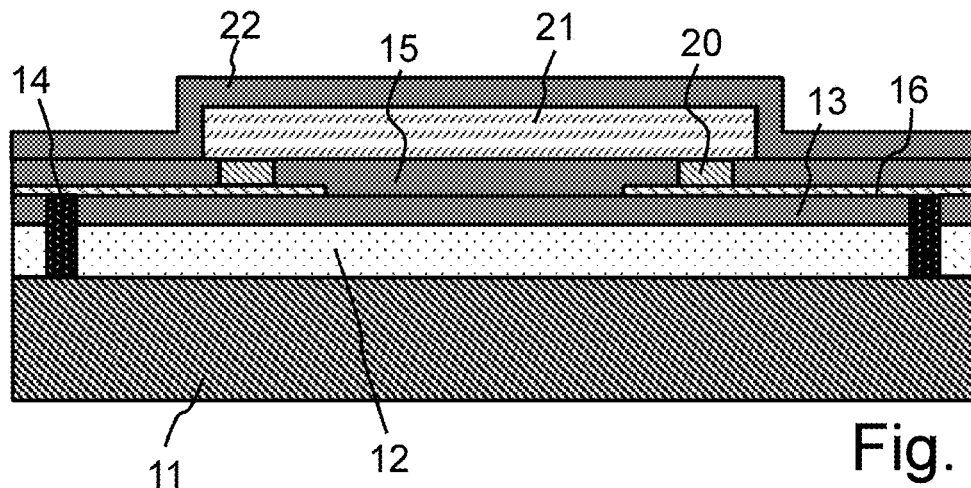
Figure 3I:
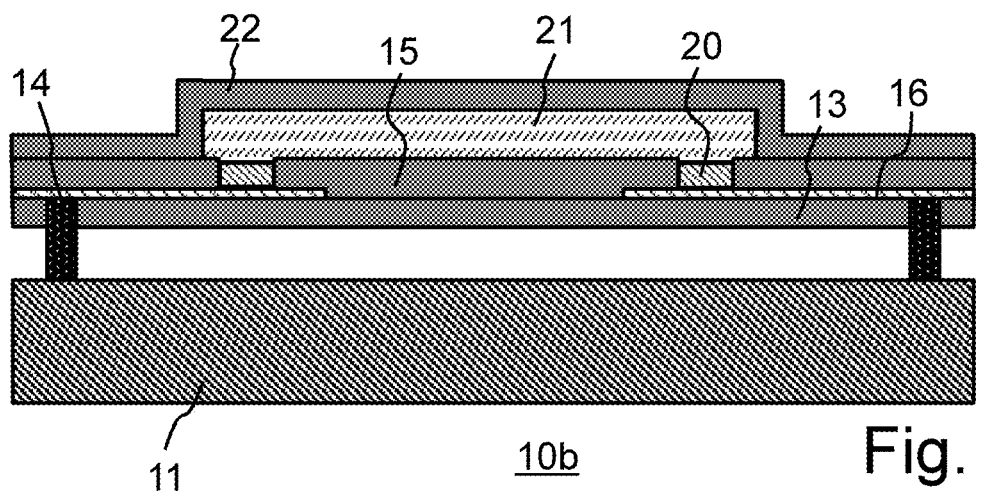

Whatever the embodiment used to form planar surface Sp, the invention enables to obtain a planar surface Sp having conductive vias 20 emerging thereon. Thermometric or thermoresistive material 21 may thus be deposited on this planar surface Sp. Preferably, thermometric or thermoresistive material 21 is made of vanadium oxide deposited by ion beam with a thickness in the range from 10 to 200 nanometers, as illustrated in FIGS. 2g and 3g.

The ion beam deposition technique is also known by acronym IBD, for Ion beam deposition, or IBS, for Ion beam sputtering.

As a variant, thermometric or thermoresistive material 21 may be made of any other oxide of transition metals formed by physical vapor deposition or PVD techniques, for example, titanium or nickel oxide. As illustrated in FIGS. 2h, 3h, 4j, 5k, 6h, and 7h, a protection layer 22 is preferably deposited on thermometric or thermoresistive material 21 and on stop layer 30 to protect thermometric or thermoresistive material 21 during the step of removal of sacrificial layer 12. This protection layer 22 may be made of amorphous silicon having a thickness in the range from 3 to 30 nanometers.

Before removing sacrificial layer 12, it is possible to limit the thickness of the areas intended to form the arms for holding the membrane of microbolometer 10a-10f to limit the thermal conduction between substrate 11 and thermometric or thermoresistive material 21.

For this purpose, protection layer 22 may be etched in the areas intended to form the holding arms. Further, stop layer 30 and a portion of dielectric layer 15 may also be etched in these areas to further limit the thickness of these holding arms.

The thickness decrease may also be obtained before the deposition of thermometric or thermoresistive material 21. For example, a thinning stop layer may be deposited between two layers forming dielectric layer 15. After having deposited stop layer 30 on this assembly comprising the two layers forming electric layer 15 and the thinning stop layer, openings 17 may be formed through all these layers before forming conductive vias 20.

As a variant, it is possible to define the structure of the membrane and of the holding arms before the forming of conductive vias 20 and the deposition of thermometric or thermoresistive material 21.

At the end of this step of forming of conductive vias 20 and before depositing thermometric or thermoresistive material 21, it is then possible to perform the thinning of the holding arms all the way to the thinning stop layer by removing stop layer 30 and the upper layer forming dielectric layer 15. The thinning stop layer may then be removed to obtain holding arms only comprising the lower portion of dielectric layer 15.

Whatever the method of structuring of the holding arms or even of anchoring nails 14, the invention enables to obtain a microbolometer 10a-10f comprising a thermometric or thermoresistive material 21 thermally and electrically coupled to the electrodes of absorber or electrode 16 by conductive vias 20.

Absorber or electrode 16 and thermometric or thermoresistive material 21 being deposited on planar surfaces, it is possible to obtain a microbolometer 10a-10f with an improved performance with respect to microbolometers of the state of the art.

The invention claimed is:

1. An infrared imaging microbolometer integrating a membrane assembled in suspension above a substrate by means of holding arms attached to anchoring nails, said membrane comprising:
   a support layer crossed by the anchoring nails;
   an absorber or electrode, deposited on the support layer and on the anchoring nails with a pattern forming at least two electrodes;
   a dielectric layer deposited on said absorber or electrode and on the support layer;
   at least two conductive vias formed through the dielectric layer in contact with said at least two electrodes; and
   a thermometric or thermoresistive material arranged on a planar surface formed at the level of the upper ends of said conductive vias.

2. An infrared imaging microbolometer according to claim 1, wherein the thermometric or thermoresistive material is made of vanadium oxide, of titanium oxide, or of nickel oxide.

3. An infrared imaging microbolometer according to claim 1, wherein the thermometric or thermoresistive material is covered with a protection layer.

4. A method for the forming of an infrared imaging microbolometer according to claim 1, comprising the following steps:
   deposition of a sacrificial layer and of a support layer on a substrate;
   forming of anchoring nails through the sacrificial layer and the support layer;
   deposition of an absorber or electrode on the support layer and on the anchoring nails and structuring of the absorber or electrode;
   deposition of a dielectric layer on the absorber or electrode and on the support layer;
   structuring of the dielectric layer to form openings extending all the way to said absorber or electrode;
   deposition of a conductive material based on tungsten to fill the openings thus formed within the dielectric layer and to ensure an electric contact between said conductive material and said absorber or electrode;
   removal of the conductive material from the openings to form a planar surface;
   deposition of a thermometric or thermoresistive material on the planar surface so that the thermometric or thermoresistive material is thermally and electrically connected to said absorber or electrode via the conductive vias deposited in the openings of the dielectric layer;
   structuring of the holding arms; and
   removal of the sacrificial layer.

5. A method for the forming of a microbolometer according to claim 4, wherein the step of removal of the conductive material is performed by means of a chemical-mechanical polishing.

6. A method for the forming of a microbolometer according to claim 4, wherein the step of removal of the conductive material is performed by means of a reactive ion etching with a stop on the dielectric layer.

7. A method for the forming of a microbolometer according to claim 4, wherein the deposition of the conductive material is performed by a conformal or vapor deposition.

8. A method for the forming of a microbolometer according to claim 4, wherein the dielectric layer is structured by means of a reactive ion etching with a stop on the absorber or electrode.

9. A method for the forming of a microbolometer according to claim 4, wherein the dielectric layer is structured to obtain openings having a width smaller than 1 micrometer.

10. A method for the forming of a microbolometer according to claim 4, also comprising the following steps:
   deposition of a stop layer on the dielectric layer before the latter is structured so that the openings extend through said dielectric layer and said stop layer;
   structuring of the dielectric layer by means of a first reactive ion etching of said stop layer and of a second reactive ion etching of said dielectric layer;

deposition of the conductive material based on tungsten formed in the openings of said stop layer and of said dielectric layer; and removal of said conductive material from the openings by means of a chemical-mechanical polishing of said conductive material at least all the way to the level of the stop layer.

11. A method for the forming of a microbolometer according to claim 10, wherein, when the chemical polishing of the conductive material is performed all the way to the level of the stop layer, the deposition of the thermometric or thermoresistive material is formed on said conductive material and on said stop layer.

12. A method for the forming of a microbolometer according to claim 10, wherein, when the chemical-mechanical polishing of the conductive material is performed all the way to the level of the dielectric layer, the removal of the stop layer is performed, the deposition of the thermometric or thermoresistive material then being performed on said conductive material and on said dielectric layer.

13. A method for the forming of a microbolometer according to claim 4, comprising a step of thinning of the dielectric layer in an area intended to form the holding arms of the microbolometer.

14. A method for the forming of a microbolometer according to claim 13, comprising a step of deposition of a thinning stop layer at the level of the holding arms of the microbolometer, said thinning step being carried out all the way to said thinning stop layer.

15. A method for the forming of an infrared imaging microbolometer according to claim 1, comprising the following steps:
deposition of a sacrificial layer and of a support layer on a substrate;
forming of anchoring nails through the sacrificial layer and the support layer;
deposition of an absorber or electrode on the support layer and on the anchoring nails and structuring of the absorber or electrode;
deposition of a dielectric layer based on silicon on said absorber or electrode and on said support layer;
local deposition of a metal siliciding material on said dielectric layer;
thermal treatment of the metal siliciding material to form an intermetallic between the metal siliciding material and said dielectric layer and to form conductive vias in said dielectric layer;
deposition of a thermometric or thermoresistive material on said dielectric layer so that said thermometric or thermoresistive material is thermally and electrically connected to the absorber or electrode via the conductive vias formed within said dielectric layer;
structuring of the holding arms; and
removal of the sacrificial layer.

16. A method of forming of a microbolometer according to claim 15, wherein the step of local deposition of the metal siliciding material on the dielectric layer comprises the following sub-steps:
deposition of a sacrificial layer on said dielectric layer;
structuring of said sacrificial layer to form openings extending all the way to said dielectric layer;
deposition of the metal siliciding material, made of nickel or cobalt and possibly with added platinum, to fill the openings thus formed within said dielectric layer;
removal of the metallic material from the useful siliciding areas, particularly by wet etching; and
removal of the sacrificial layer.

17. A method of forming a microbolometer according to claim 16, wherein the step of local deposition of the metal siliciding material on the dielectric layer also comprises a sub-step of partial etching of said dielectric layer at the level of the openings prior to the step of deposition of the metal siliciding material.

18. A method of forming a microbolometer according to claim 15, wherein the step of thermal treatment of the metal siliciding material is carried out with a temperature in the range from 350° C. to 450° C. for a time period of at least 30 seconds.

19. A method of forming of a microbolometer according to claim 15, wherein the step of local deposition of the metal siliciding material on the dielectric layer is carried out by photolithography, and then deposition of the metal siliciding material, and finally, resin removal.

20. A method of forming an infrared imaging microbolometer according to claim 1, comprising the following steps:
deposition of a sacrificial layer and of a support layer on a substrate;
forming of anchoring nails through the sacrificial layer and the support layer;
deposition of an absorber or electrode on the support layer and on the anchoring nails and structuring of the absorber or electrode;
deposition of a dielectric layer on the absorber or electrode and on the support layer;
deposition of a masking layer on said dielectric layer;
structuring of the masking layer to form openings extending all the way to said dielectric layer;
ion implantation of a metal element through said openings to incorporate the metal element into the dielectric layer and to form conductive vias in said dielectric layer;
removal of the masking layer;
deposition of a thermometric or thermoresistive material on the dielectric layer so that the thermometric or thermoresistive material is thermally and electrically connected to said absorber material or electrode via the conductive vias formed in said dielectric layer;
structuring of the holding arms; and
removal of the sacrificial layer.

21. A method of forming a microbolometer according to claim 20, wherein the metal element is made of nickel, titanium, manganese, cobalt, or aluminum.

22. A method of forming a microbolometer according to claim 20, wherein the ion implantation step is carried out by a plurality of successive implantations having different ion acceleration voltages.

23. A method of forming a microbolometer according to claim 20, wherein said method further comprises a thermal treatment of the metal element.

* * * * *